United States Patent [19]
Takahashi et al.

[11] Patent Number: 5,487,144
[45] Date of Patent: Jan. 23, 1996

[54] SCHEDULING SYSTEM

[75] Inventors: Kimikazu Takahashi; Haruko Mitake; Shigeru Fujimura, all of Tokyo, Japan

[73] Assignee: Yokogawa Electric Corporation, Tokyo, Japan

[21] Appl. No.: 124,401

[22] Filed: Sep. 20, 1993

[30] Foreign Application Priority Data

Dec. 1, 1992 [JP] Japan ................................. 4-321897
Dec. 7, 1992 [JP] Japan ................................. 4-326521

[51] Int. Cl.⁶ .................................................. G06F 3/00
[52] U.S. Cl. ........................... 395/161; 395/159; 364/401
[58] Field of Search ................................. 395/155–161, 395/500, 650; 345/117–120; 364/705.07, 705.08, 401–402, 188, 191

[56] References Cited

U.S. PATENT DOCUMENTS

| | | | |
|---|---|---|---|
| 4,813,013 | 3/1989 | Dunn | 395/159 |
| 4,937,743 | 6/1990 | Rassman et al. | 364/401 |
| 5,016,170 | 5/1991 | Pollalis et al. | 395/161 |
| 5,129,057 | 7/1992 | Strope et al. | 395/161 |
| 5,291,587 | 3/1994 | Kodosky et al. | 395/500 |
| 5,301,301 | 4/1994 | Kodosky et al. | 395/500 |
| 5,323,314 | 6/1994 | Baber et al. | 364/401 |

*Primary Examiner*—Mark R. Powell
*Assistant Examiner*—John E. Breene
*Attorney, Agent, or Firm*—Moonray Kojima

[57] ABSTRACT

A scheduling system for preparing an operational plan for a production process which is carried out by using a computer system with an improved easier programming method which does not require a human operator to have knowledge of computer programming. In the system, the operation to be scheduled is inputted as a plurality of input element rows or letter rows on a display field using a computer, a CRT display device, and various pointing devices, such as keyboard, mouse, etc. Function blocks which can assign predetermined program operations are located on the display field, and are used in combination, and are relocated to specify the operation contents and the operation order or the program, to thereby complete the logics for the scheduling.

26 Claims, 32 Drawing Sheets

Fig.4

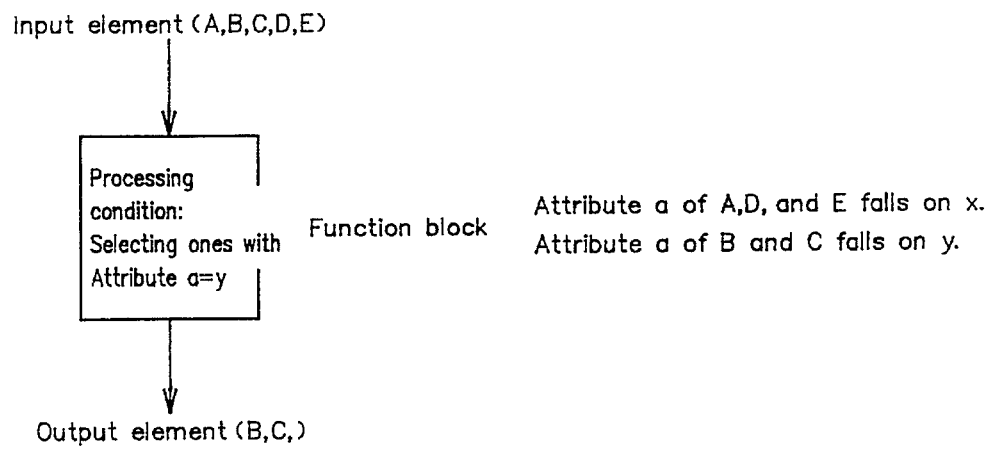

Input element (A,B,C,D,E)

Processing condition:
Selecting ones with
Attribute a=y

Function block

Attribute a of A,D, and E falls on x.
Attribute a of B and C falls on y.

Output element (B,C,)

Fig.5

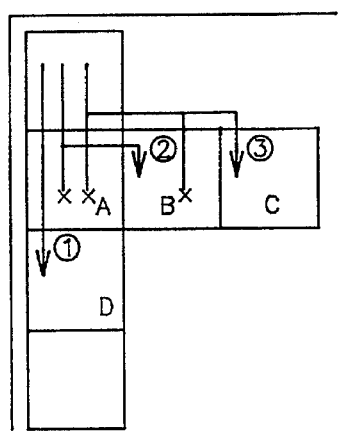

① If multiple elements are output from A,
they will be entered into D.

② If no element is output from A,
all elements input into A will be re-entered into B.

③ If no element is output either from A or B,
all elements input into them will be re-entered into C.

```
Job Basic Block
                                    ▽Help
The job(s) whose production level is
    ◎   the  [Highest]  ← A
                                      ← C
    ○         [More than]  [0▲]  ← B will be selected.

[ACCEPT]                    [CANCEL]
```

Fig.31

51
Object jobs for scheduling

| Job name | Product name | Job type | Earliest delivery time | Latest delivery time | Starting time |
|---|---|---|---|---|---|
| J1 | Medium hot curry | Production | March 1 | March 10 | |
| J2 | Hot curry | Inlet | | | March 15 |
| J3 | Mild curry | Production | March 10 | March 15 | |
| J4 | Hot curry | Production | March 1 | March 15 | |
| J5 | Mild curry | Outlet | | | March 1 |
| J6 | Medium hot curry | Production | April 1 | April 10 | |
| J7 | Hot curry | Production | March 1 | March 10 | |

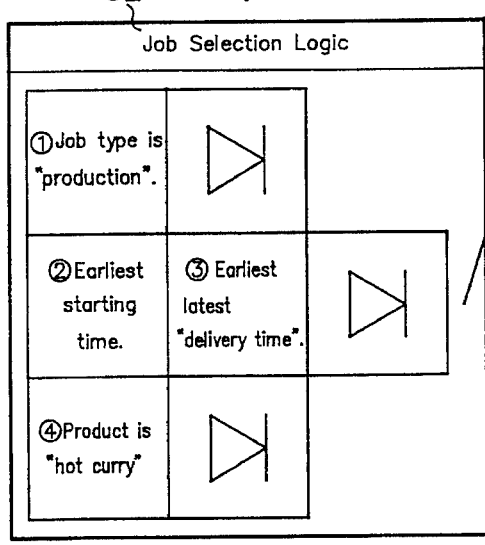

52 Job Selection Logic

① Job type is "production".

② Earliest starting time.

③ Earliest latest "delivery time".

④ Product is "hot curry"

53
Results of input/output elements of each function block

① input job> J1,J2,J3,J4,J5,J6,J7
   Output job< J1,J3,J4,J6,J7
② input job> J1,J3,J4,J6,J7
   Output job<
③ input job> J1,J3,J4,J6,J7
   Output job< J1,J4,J7
④ input job> J1,J4,J7
   Output job< J4,J7

▷ is a default block that will output the input elements as—is. This is automatically inserted to prevent a case of no element output.

J4,J7

SCHEDULING SYSTEM

BACKGROUND OF THE INVENTION

1. Field of Invention

The invention relates to a scheduling system for assisting process planning, such as an operational plan of a production process, into which is introduced by use of a computer a visual programming method. The invention is concerned with a system for representation by replacing an operation of order rows for selecting or rearranging a plurality of input elements with a rearrangement of block images on a two-dimensional image field.

2. Description of the Prior Art

Due to the rapid changes and various demands of the market, the scheduling operation of a plant becomes one of the important factors for determining productivity. It is desired to rapidly prepare a practical plan for operating the plant in response to the changing demands of the market.

The conventional operational plan of a plant depends on the experience and ability of the individual human scheduler. Thus, there are significant differences in various operational plans according to the individual preparing and carrying out such plans. Also, with human implemented operational plans, errors occur frequently. Furthermore, such conventional methods incur high costs. Also, it is desired that production be changed quickly to fullfil rapidly changing market conditions. For this reason, the cycle of change or modification of equipment is becoming shorter and the same equipment is desired to be used for a plurality of applications. When the plant and process are increasingly complicated, the ability of human operators to adapt has certain limitations and the scheduling which is prepared and implemented by humans becomes increasing difficult.

On the other hand, although various types of factory information have been gathered, developed and processed by computers, it is difficult to perform standardization and automation of the preparation of operational plans. Thus, unification of information is hindered. Where the operator must prepare an operational plan using a computer system, there are difficulties involved. The operator must prepare the required software. But, computer programming requires a certain amount of professional skill and experience, which are not always available in the concerned human operator. It is not always easy for the human operator to prepare the computer program software required to carry out an operational plan. Also, no programming method for scheduling, which is easy to prepare, now exists in the art.

SUMMARY OF THE INVENTION

Accordingly, an object of the invention is to overcome the aforementioned and other deficiencies and disadvantages of the prior art.

According to the invention, there is provided a scheduling system for automatically producing a plant operational plan by regarding the scheduling as attaching jobs onto a Gantt chart and incorporating, into a logic, an adjustment step for selecting the jobs and attaching the jobs onto the chart while simulating a human thinking process. Of the schedule prepared by automatic scheduling, when the operator or user wishes to change a part thereof, such as delivery time, or priority of jobs, a set log for strategy is prepared.

The strategy includes the following four logics:

(1) Logic for Selection of Jobs. In the case where a plurality of jobs to be scheduled are present, it is necessary to select a first job to be attached to the schedule. In the job selection logic, the condition for selecting one job is defined.

(2) Logic for Selection of Units. In the case where a plurality of units are to be usable in a part, it is determined which unit should be selected according to desired priority.

(3) Logic for Setting Process Time. It is determined where in the schedule the job to be scheduled is attached.

(4) Logic for Selection of Actually Loaded Units. In the case where a plurality of actually loaded units are set in storage units, it is determined which actually loaded units should be used according to desired priority.

Another object is to form the above described logics for setting the strategy as follows.

The law of experience and know-how conventionally used in scheduling by a scheduler are finely analyzed and are used as basic fine units which are prepared in advance as various function blocks. The function blocks are represented by using an adjustment window on a CRT (cathode ray tube) for every job and by using "if" sentences in case of selection of conditions. The scheduler completes the operation in a selection manner or a blank writing manner.

The schedule to be performed by the scheduler may be represented by various function blocks in combination on the logic formation window prepared for each kind of work, such as job selection, unit selection and process time setting. The function block groups operate like filters so that when the jobs to be scheduled (i.e. input element rows) are provided from above, the job having the highest priority will be finally selected through the filters one by one. In order to cope with the more complicated representation, the logic formation windows are made in a multi-layer formation. The operation and representation of the function blocks are exactly selected to thereby facilitate the programming.

BRIEF DESCRIPTION OF THE DRAWINGS

FIG. 4 is a diagram depicting a function of a function block.

FIG. 5 is a diagram depicting the rule for transfer of an input element to the function blocks.

PIGS. 16 (a) and 16 (b) are views depicting a selection block within upper/lower limit of stock quantity and an adjustment image field.

Figure 17:
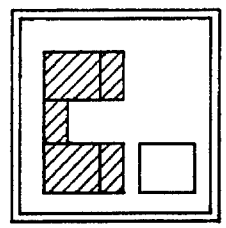
Figure 17:
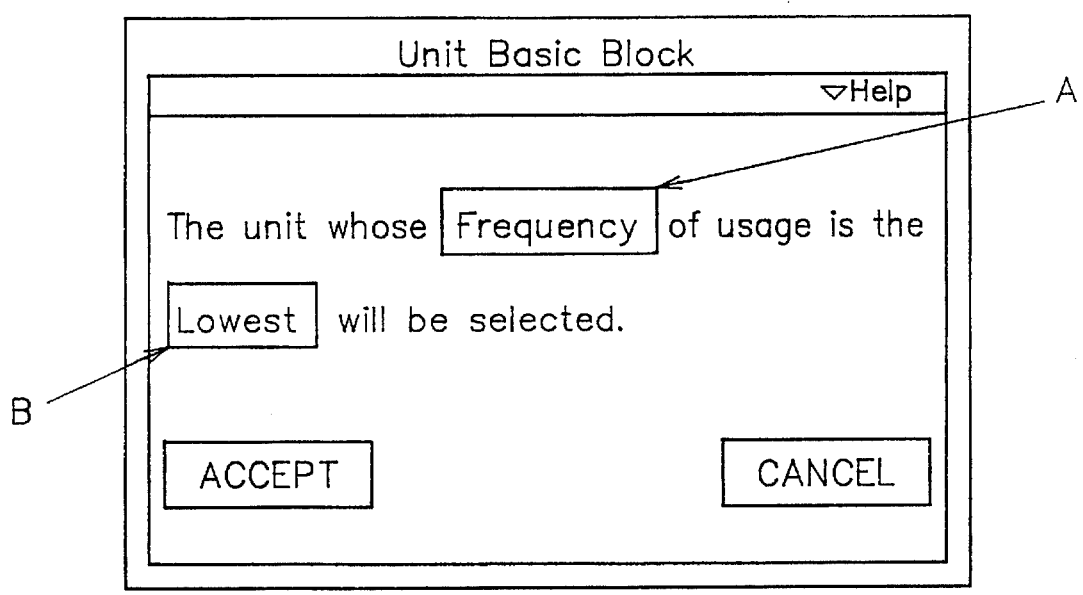

FIGS. 17 (a) and 17 (b) are views depicting a use status selection block and an adjustment image field.

Figure 18:
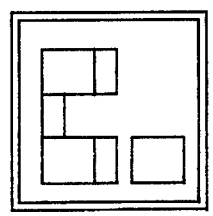
Figure 18:
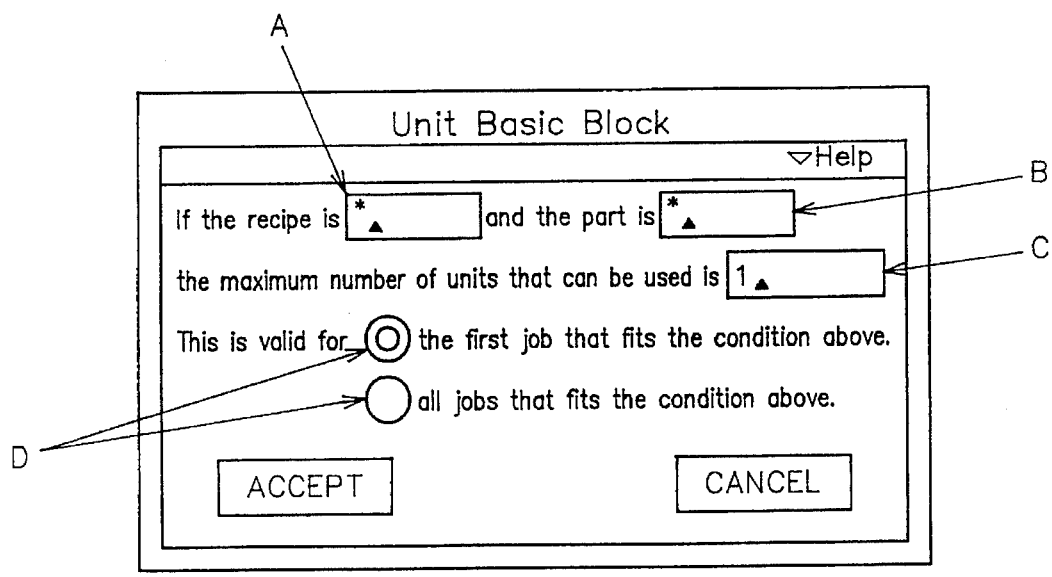

FIGS. 18 (a) and 18 (b) are views depicting a part element number restricting block and an adjustment Image field.

Figure 19:
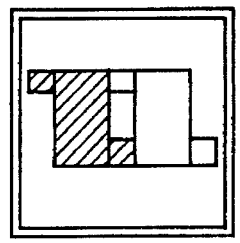
Figure 19:
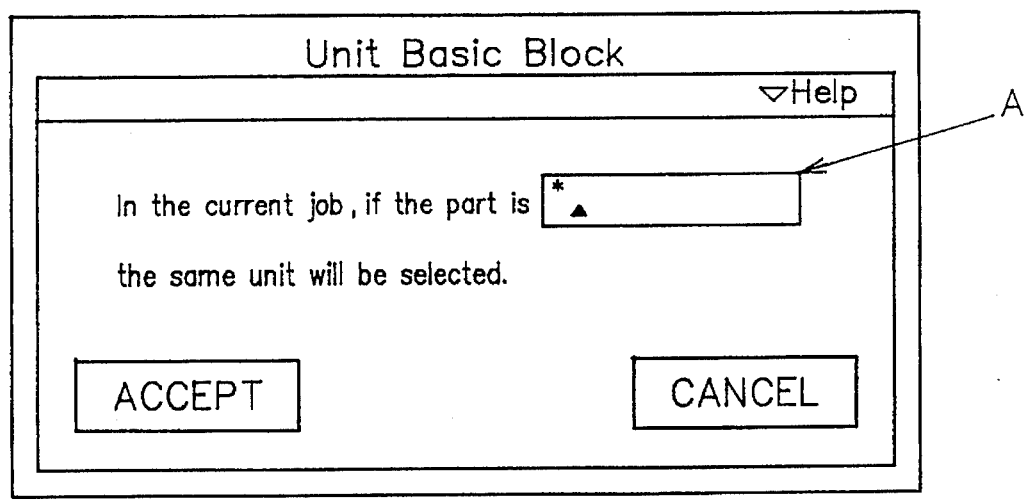

FIGS. 19 (a) and 19 (b) are views depicting the same element consecutive selection block and an adjustment image field.

Figure 20:
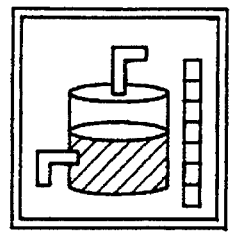
Figure 20:
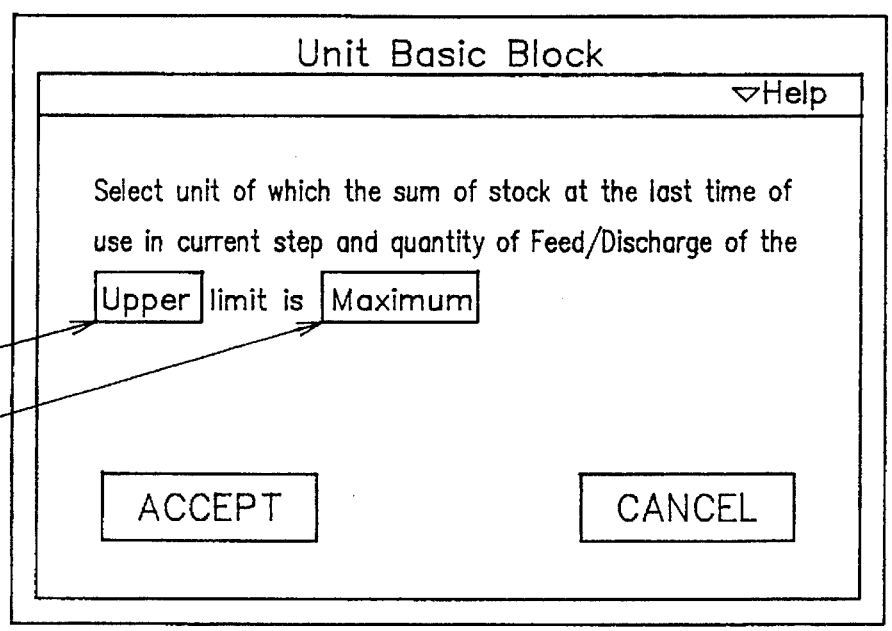

FIGS. 20 (a) and 20 (b) are views depicting a selection block within upper/lower limit of stock quantity and an adjustment image field.

Figure 21:
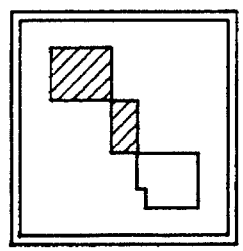
Figure 21:
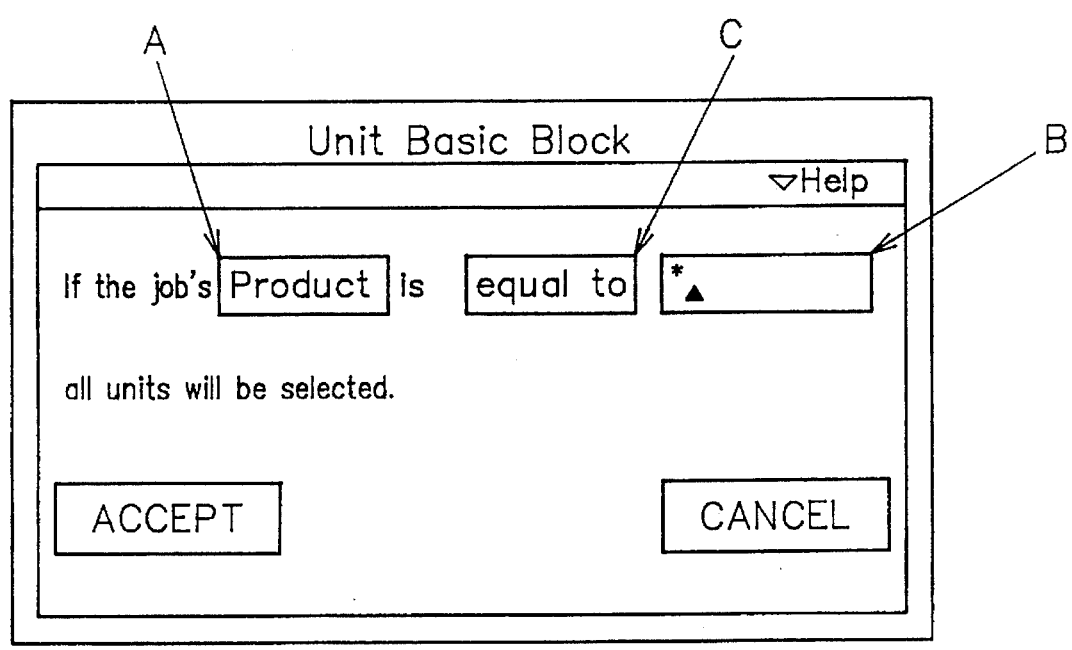

FIGS. 21 (a) and 21 (b) are views depicting a job attribute select/on block and an adjustment image field.

Figure 22:
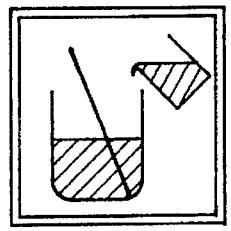
Figure 22:
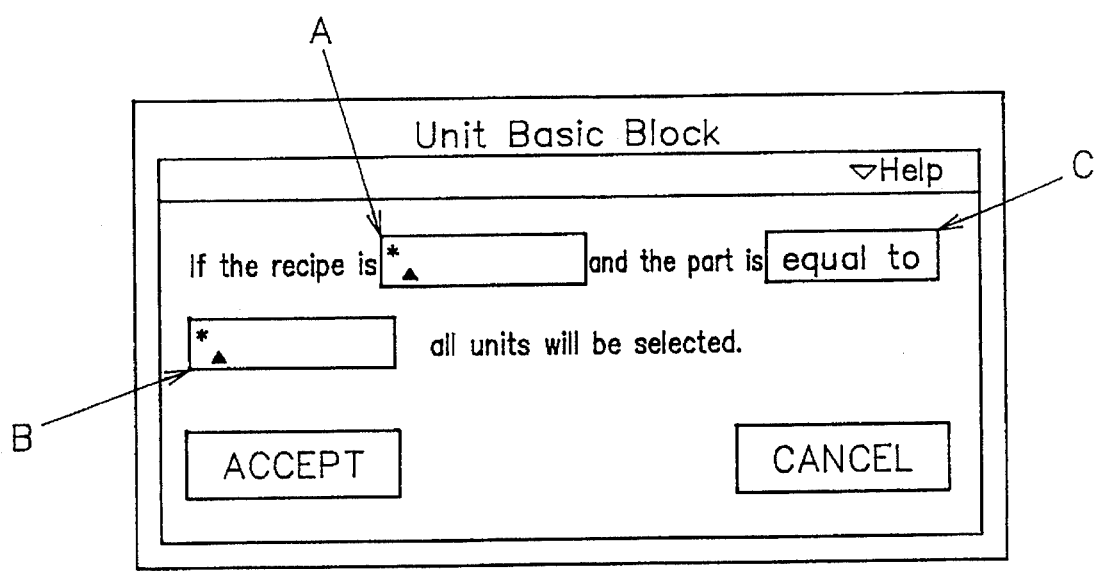

FIGS. 22 (a) and 22 (b) are views depicting a part selection block and/an adjustment image field.

Figure 23:
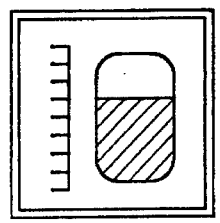
Figure 23:
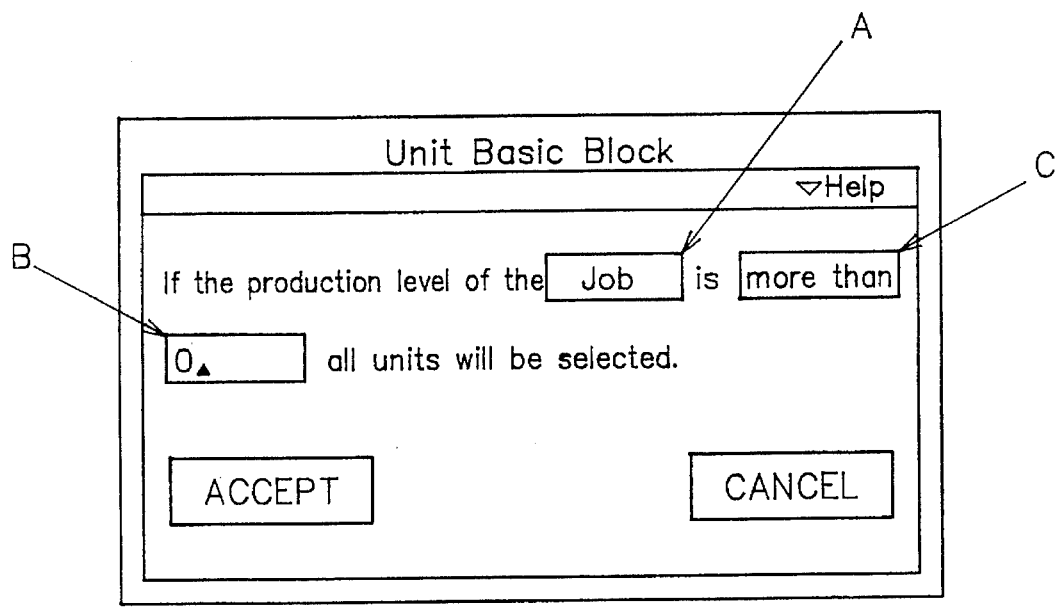

FIGS. 23 (a) and 23 (b) are views depicting a production quantity , selection block and an adjustment image field.

Figure 24:
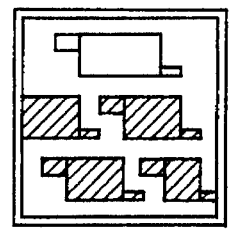
Figure 24:
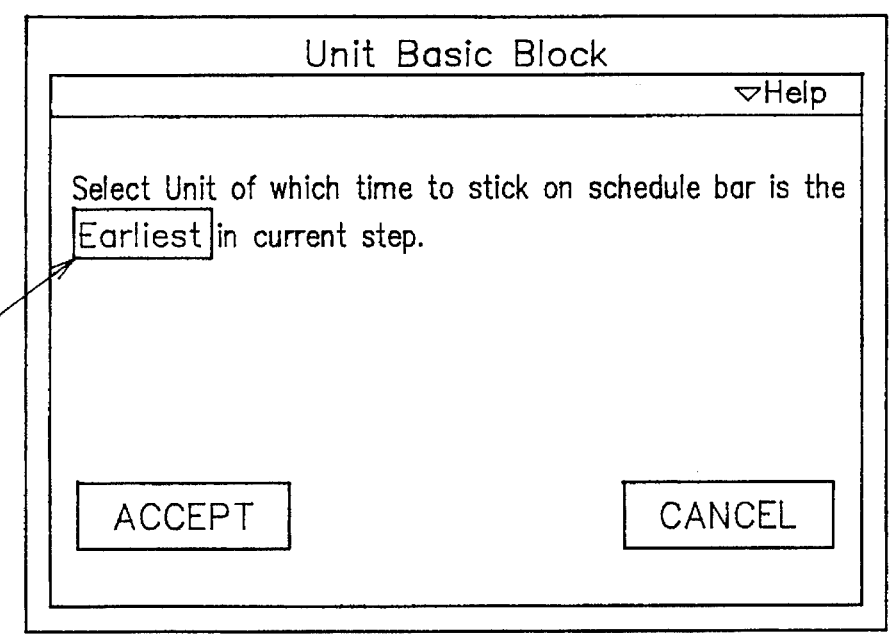

FIGS. 24 (a) and 24 (b) are views depicting an assigned time selection block and an adjustment image field.

Figure 25:
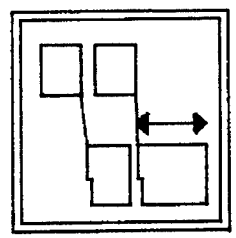
Figure 25:
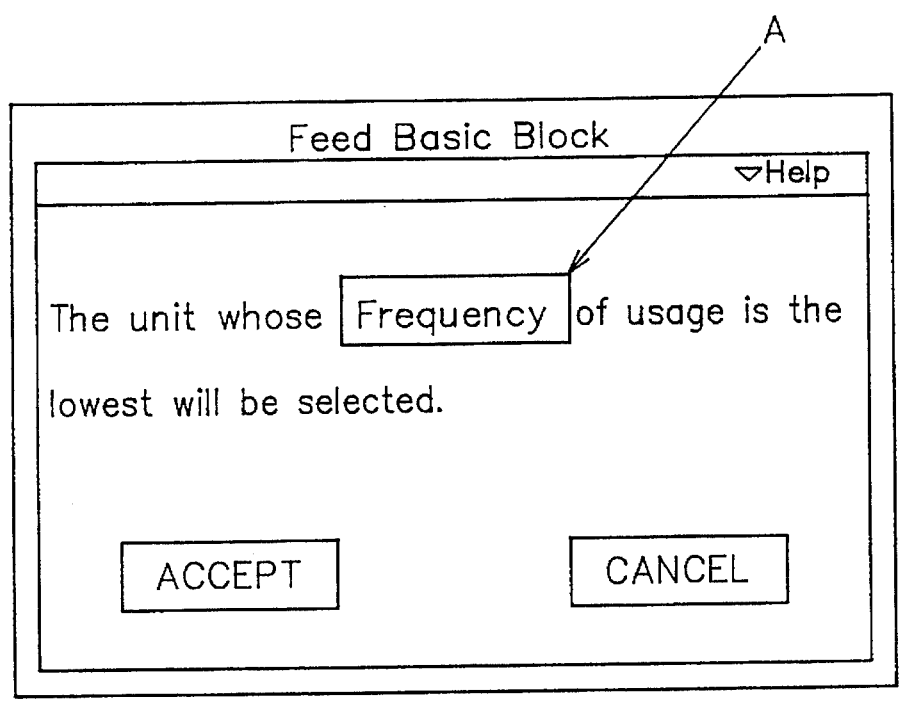

FIGS. 25 (a) and 25 (b) are views depicting a use status selection blocks in feeding and an adjustment image field.

Figure 26:
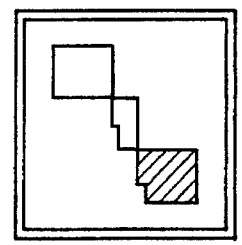
Figure 26:
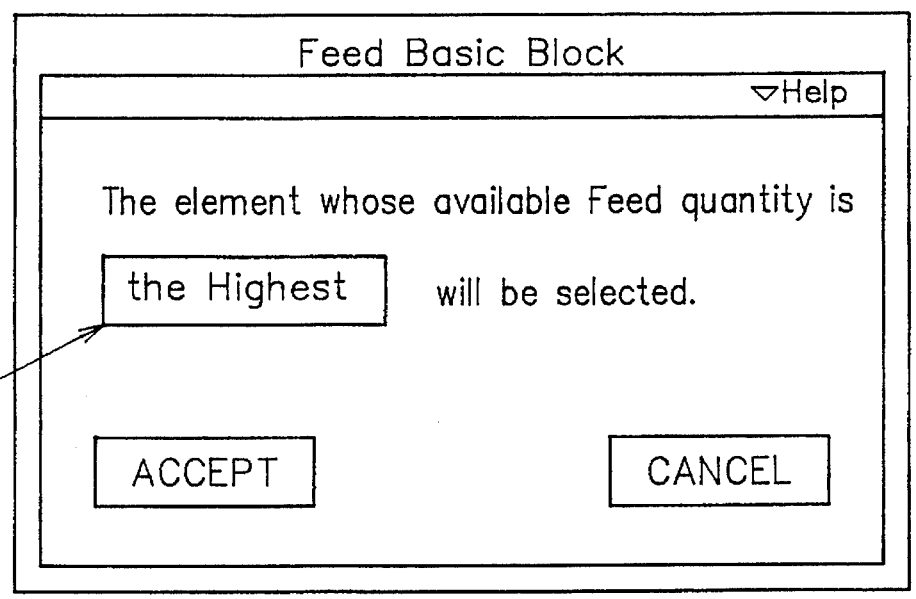

FIGS. 26 (a) and 26 (b) are views depicting a stock quantity status selection block in feeding and an adjustment image field.

Figure 27:
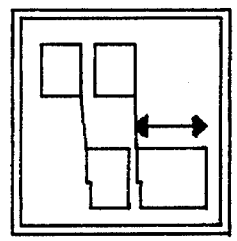
Figure 27:
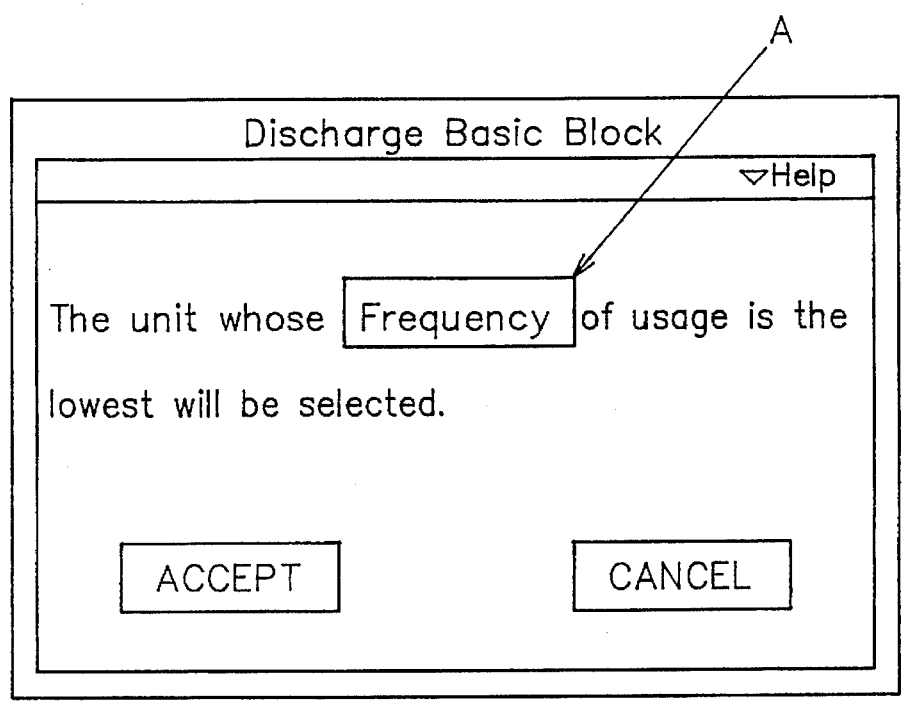

FIGS. 27 (a) and 27 (b) are views depicting a use status selection block in discharging and an adjustment image field.

Figure 28:
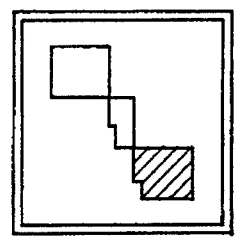
Figure 28:
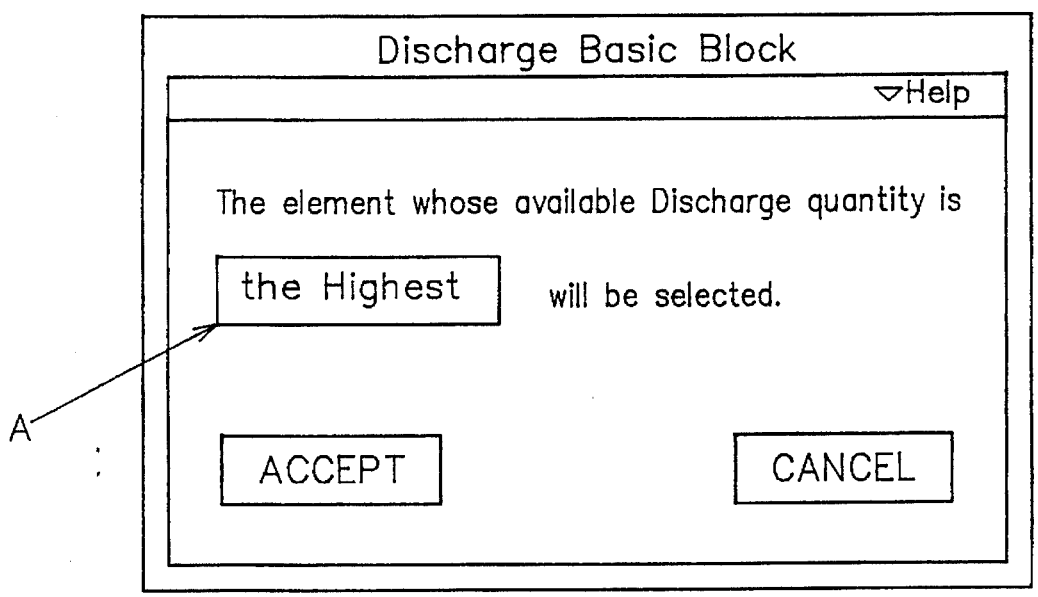

FIGS. 28 (a) and 28 (b) are views depicting a stock quantity status selection block in discharging and an adjustment image field.

Figure 29:
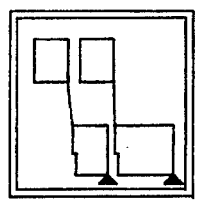
Figure 29:
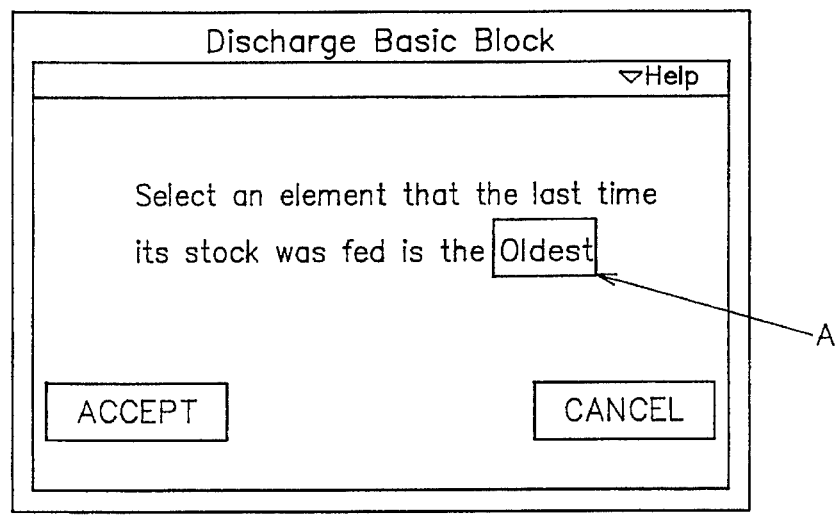

FIGS. 29 (a) and 29 (b) are views depicting a discharge time selection block and an adjustment image field.

Figure 30:
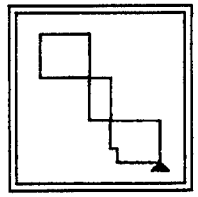

FIG. 30 is a view depicting an empty stock selection block.

FIG. 31 is a view depicting an example which forms a job selection logic.

Figure 32:
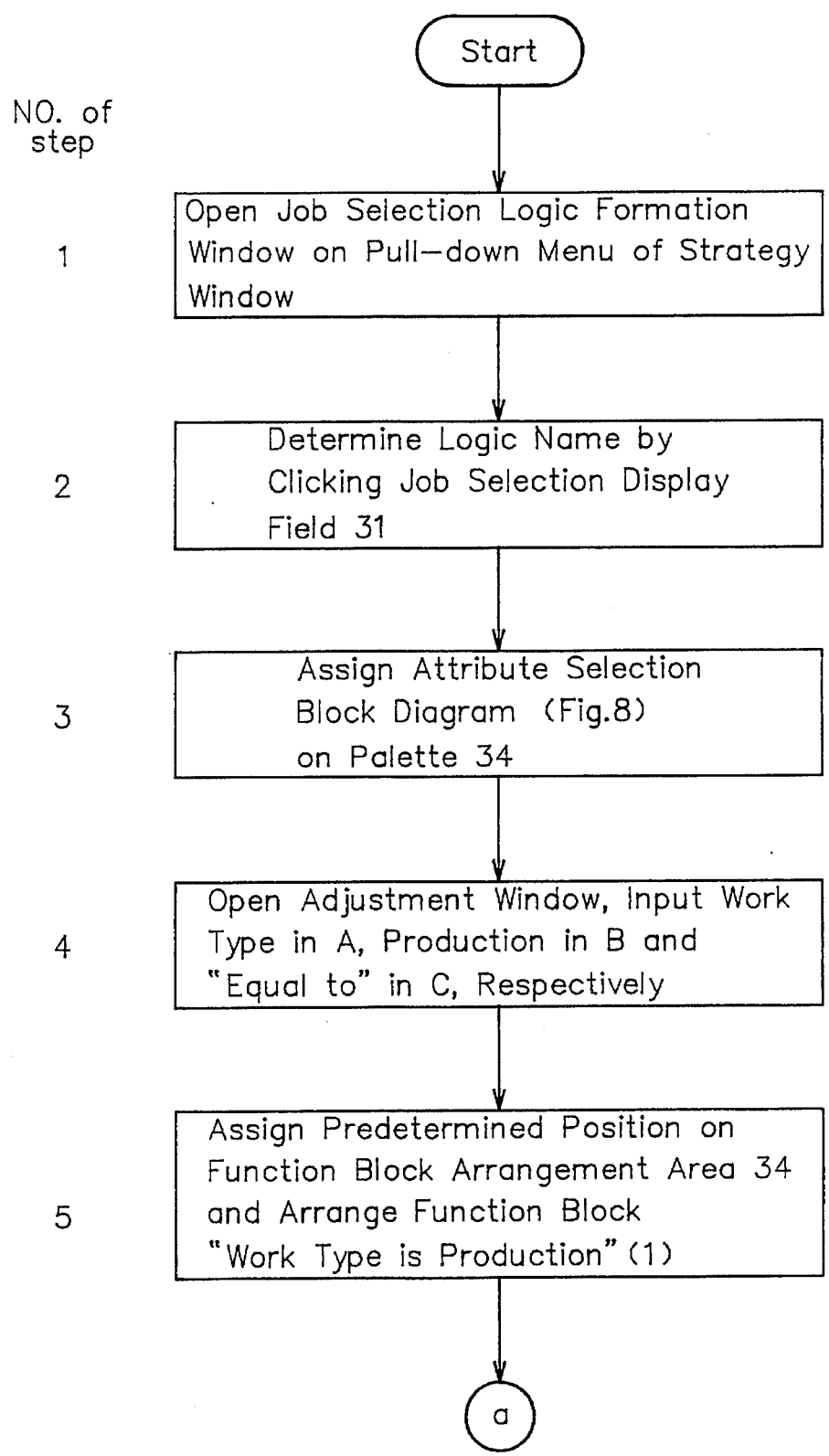
Figure 32:
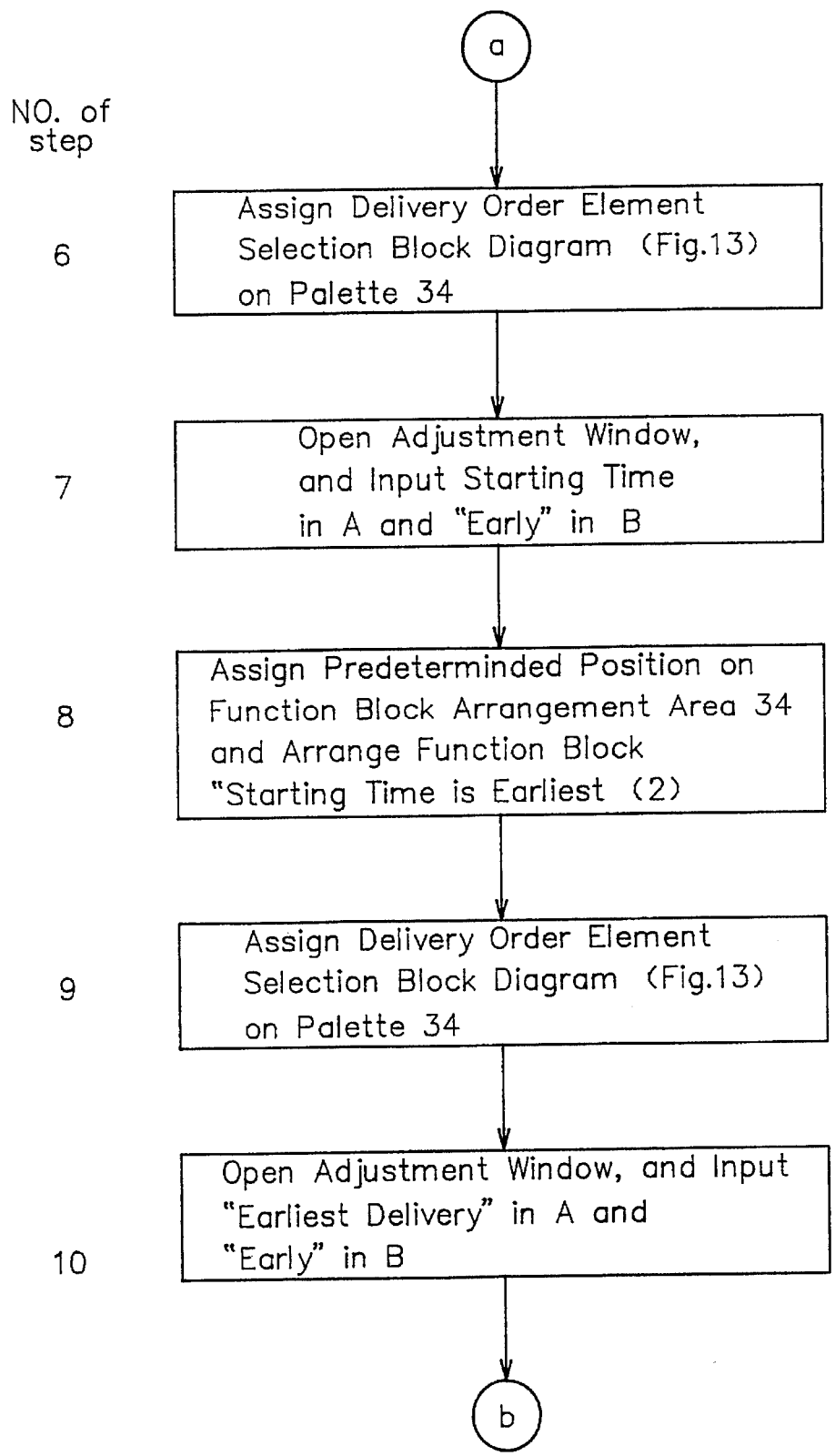
Figure 32:
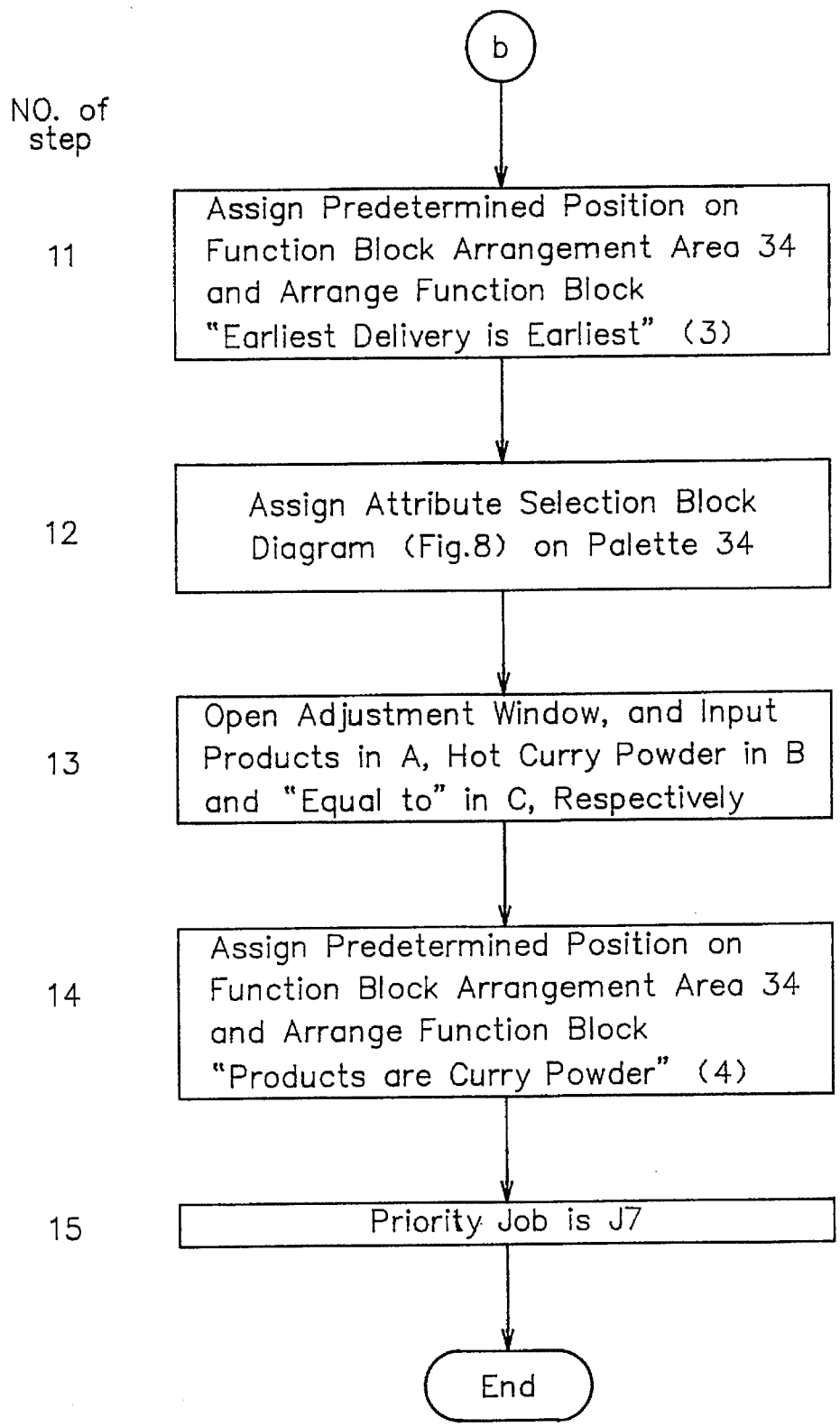

FIGS. 32 (a), 32 (b) and 32 (c), together, are a flow chart depict an example of the operation which forms a job selection logic.

Figure 33:
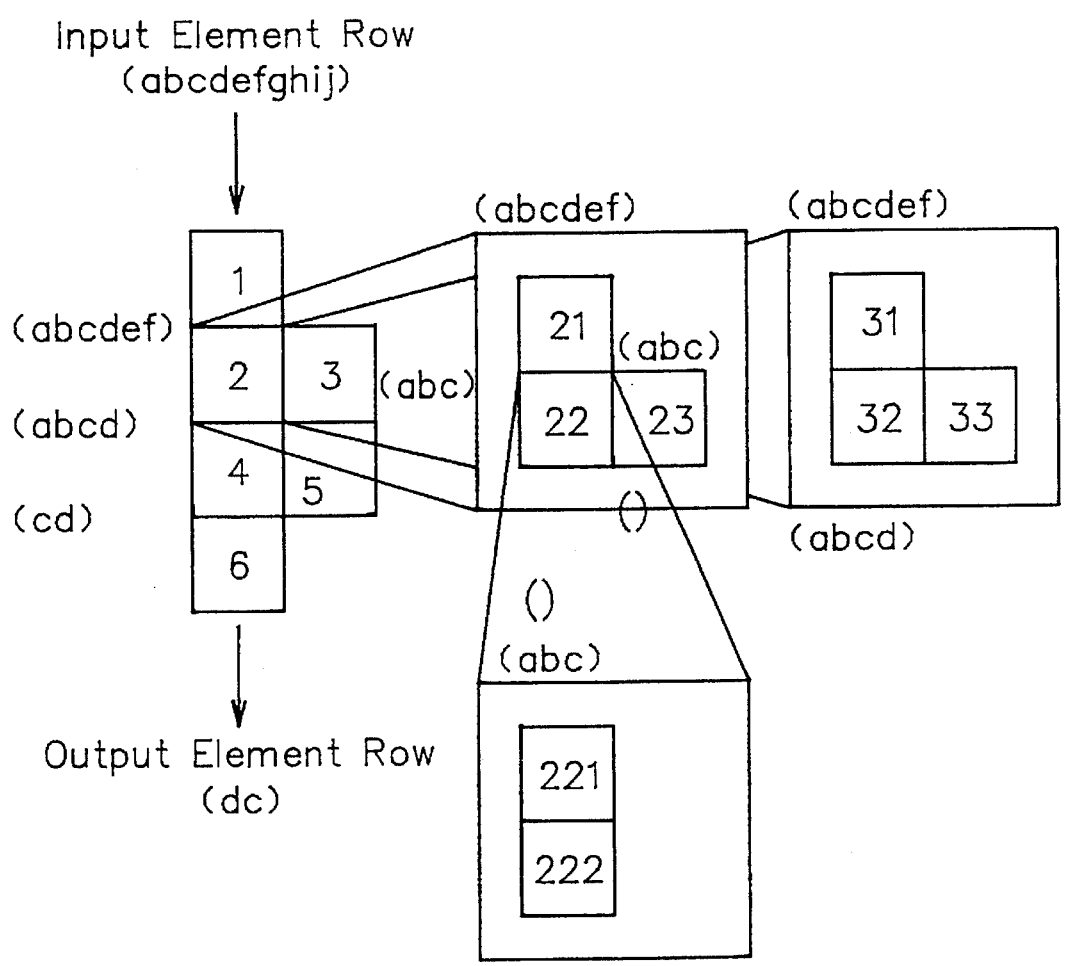

FIG. 33 is a view depicting a multiple layer formation of the logic forming window.

DETAILED DESCRIPTION OF THE PREFERRED EMBODIMENTS

Figure 1:
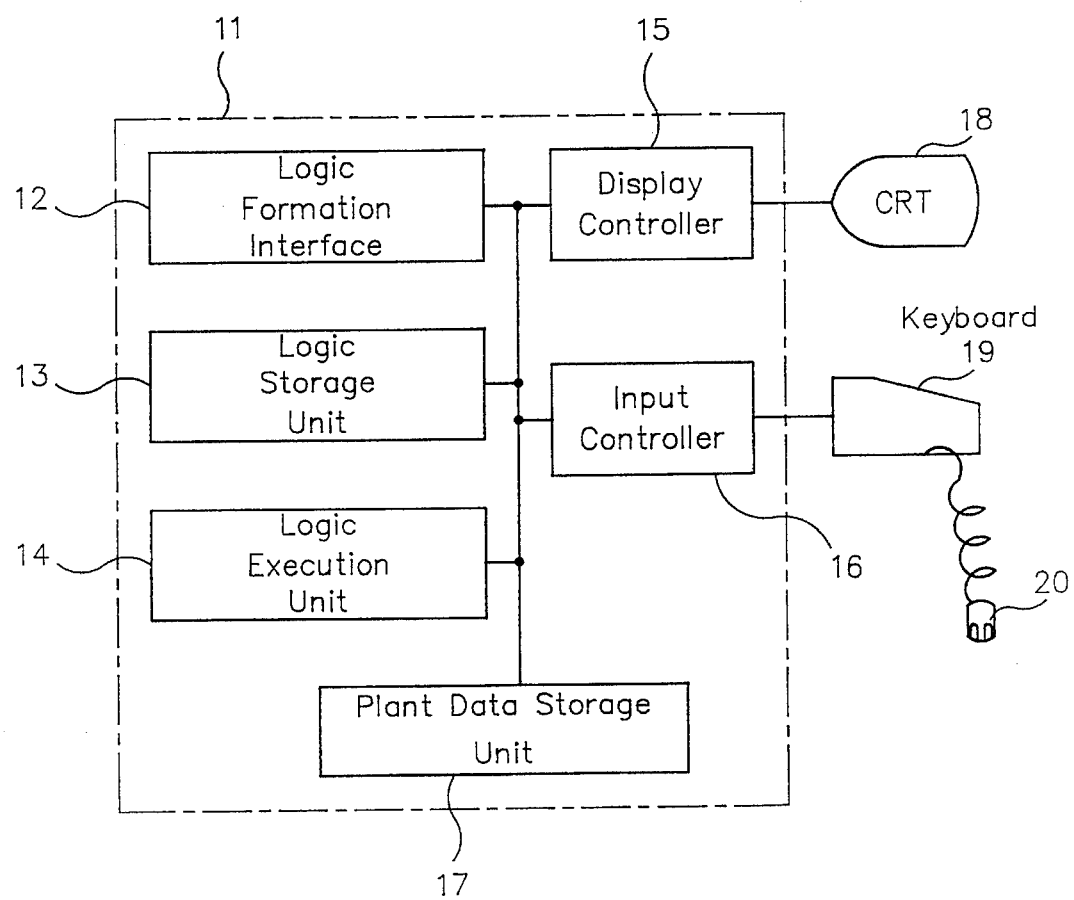
FIG. 1 is a block diagram depicting an illustrative embodiment of the invention.

FIG. 1 shows an automatic scheduling system comprising a processing unit 11, using a computer, a display CRT 18, a keyboard 19 and a pointing device or mouse 20. The processing unit 11 comprises a logic formation interface 12, which displays function blocks for assigning a predetermined program operation on a display image field of a display means 18, such as a CRT, in correspondence with intrinsic figures such as rectangular shapes, assigns content and operational order of the program by combining and rearranging the plurality of figures, compiles the program of the preslected logics, and has compiling functions, such as adjustment off parameter of the function blocks, to complete the logic program for scheduling.

A logic storage unit 13 is provide in processing unit 11, which stores and manages the program of the logics formed and compiled in logic formation interface 12. The program is transferred to a logic execution unit 14 where it is evaluated and executed.

Logic execution unit 14 evaluates the logics read out from logic storage unit 13 together with input element rows to the logics and outputs output element rows. Logic execution unit 14 performs an evaluation of individual function blocks, a filter process and control of a subsequent item selection.

A display controller 15 is provided which controls the display on CRT 18 and opens a window on the CRT. An input controller 16 controls an input from keyboard 19 or pointing device 20.

A plant data storage unit 17 stores, as unit information, operation data such as kinds and numbers off plants and lines used in the process by inputting these data by a telecommunication device or a manual operation.

The letter characters for an adjustment image field for setting specific conditions for the input element rows and function blocks to be scheduled, are inputted on the display image field using a blank writing method. The function blocks are designated by the pointing device 20 and are compiled.

The operation of the embodiment will now be described with reference to FIG. 1. The following operational data are displayed on the image field of the CRT 18 and are executed by key board 19 and pointing device 20.

A variety of function blocks which are necessary to form a scheduling system are registered and stored in advance in logic storage unit 13. According to the illustrative embodiment, 24 function blocks are used.

The registered function blocks are formed of a pair of block diagram displaying program for displaying kinds of functions in blocks on the graphic image field, a computing program completed in accordance with a writing program for specifying the operation within the range of the kinds of assigned functions on the adjustment image field, and the written program.

In addition, the various logic formation windows are stored together.

The following operation is executed in logic formation interface 12.

The job selection logic formation window is retrieved as an example from logic storage unit 13 on CRT 18 by pointing at the window using key board 19 or pointing device or mouse 20. Subsequently, the function block diagram is retrieved and displayed on a pallet 34 from logic storage unit 13. A cursor is clicked on a predetermined function block. The cursor is clicked at a predetermined position on a function block location area so that the location area is determined. When the function block is determined, the adjustment image field is retrieved from logic storage unit 13, and the operational condition is specified within the range of the kinds of designated functions. This operation is performed by selecting letter characters within a predetermined range. In accordance with this writing operation, the operation of the computer program in the form of a pair of programs is simultaneously determined, and on the basis of the fact that the function block location area is determined, the operational order among the computer programs is determined. FIG. 5 shows the rule for determining the operational order. It is possible to understand as if a phantom terminal were provided on any one of the upper/lower and right/left portions of the function block diagram and the coupling were effected. When such a visual operation is completed, the location of the function block is finished.

Thus, the function block diagram having the necessary functions are located one by one so that the desired job selection logic on the job selection logic formation window may be represented as a group of the function blocks, and at the same time, the logic computer program for the function operation is completed. The completed job selection logic is stored and reserved in logic storage unit 13 am a pair of block diagram displaying program and a computing program.

The logic execution unit 14 retrieves and executes the specific job selection logics stored in advance in the logic storage unit 13. Upon execution, in the case where the data registered in advance in the program based upon the data stored in plant data storage unit 17 are desired to be compensated for, the compensation is effected by rewriting the adjustment image field on logic formation interface 12, is stored in logic storage unit 13 and is executed by logic execution unit 14. The results of the execution are displayed on CRT 18 through display controller 15.

Figure 2:
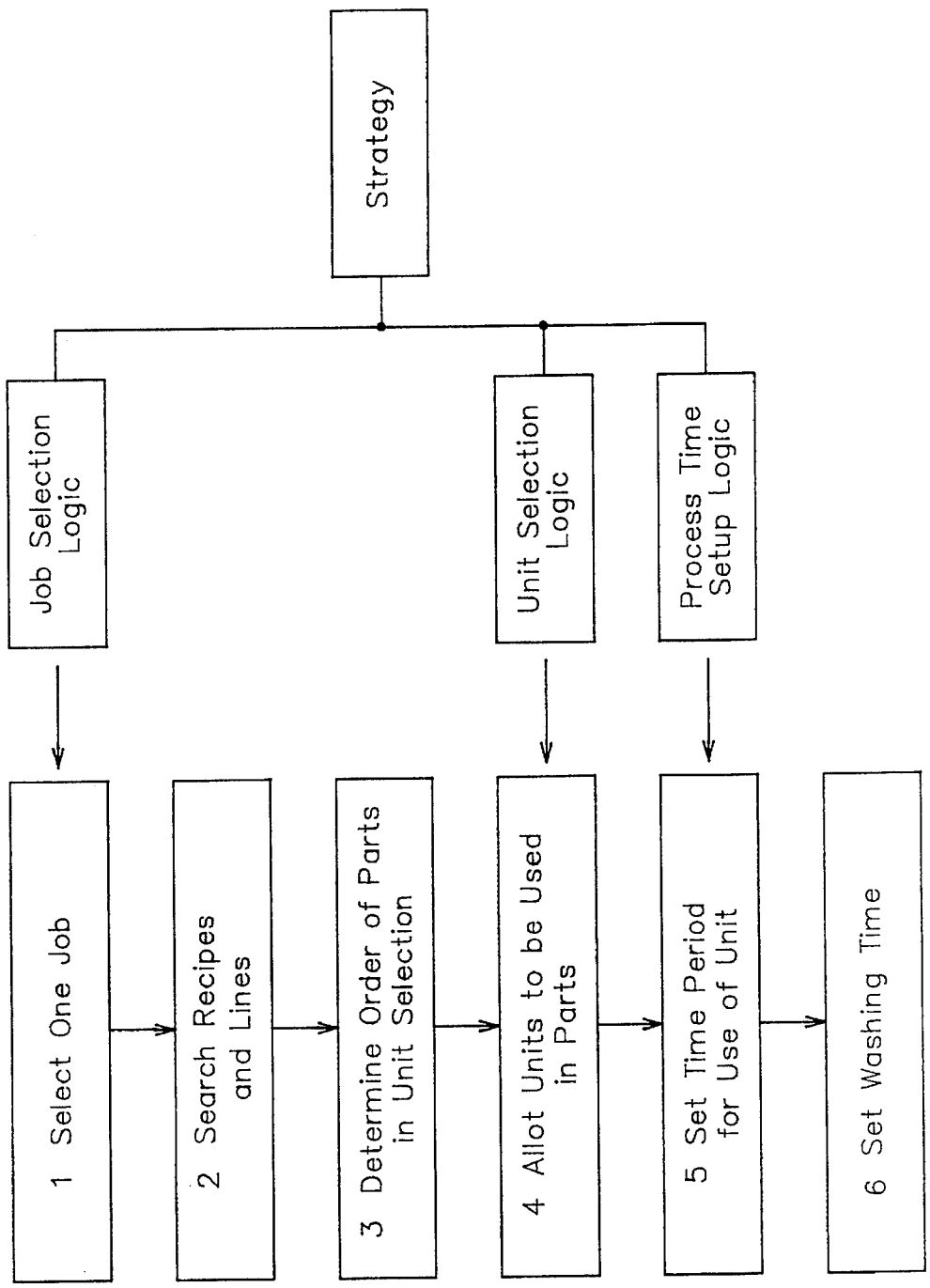
FIG. 2 is a diagram depicting the relationship between the mechanism and strategy of an automatic scheduling system.

The various functions and operations which are executed on the logic formation interface 12 will now be explained in detail. FIG. 2 shows the mechanism and strategy of automatic scheduling, namely, as follows.

(1) One job to be scheduled is selected from a job group held in the schedule. The selection is performed in accordance with the job selection logic.

(2) A recipe for the selected job is searched and furthermore a line is searched.

(3) Since the line includes a plurality of parts, when a unit to be used is selected from the usable units for every part, the order of the parts is determined.

(4) The units to be used in the parts are assigned in accordance with the determined order. This operation is performed in accordance with the unit selection logic.

(5) The time period for use of the unit is set on the basis of the earliest delivery, the latest delivery, and the start time. The operation is performed in accordance with the process time setting logic.

(6) In the case where a cleaning(or washing) time is set, the cleaning or washing time is set in the job.

The scheduling for one job is completed through use of steps (1) through (6).

Figure 3:
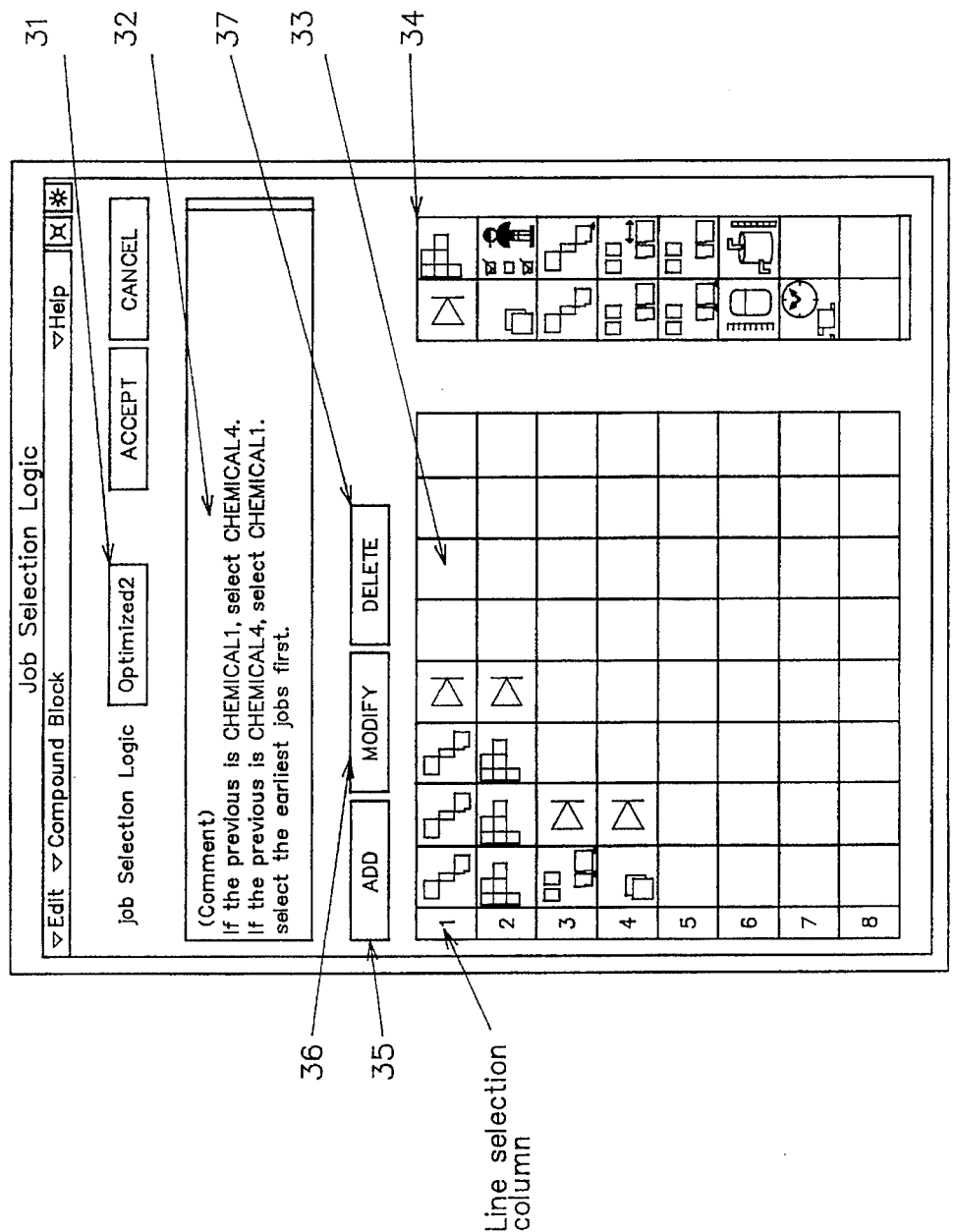
FIG. 3 is a diagram depicting one example of a job selection logic formation window.

FIG. 3 shows an exemplary display image field of the job selection logic formation window. Various windows for respective jobs to be explained below, are prepared. In the window to be first opened, the cursor is moved to the logic formation area and clicked by a cursor so that a next pull-down menu is provided.

(1) Job Section Logic Formation Window.

A logic for selecting one according to a desired priority from a plurality of jobs is formed.

(2) Unit Selection Logic Formation Window.

In the case where the plurality of usable units are set in a storage part (such as an industrial process, equipment, and area for storing products), a logic is formed as to which unit should be assigned according to a desired priority.

(3) Process Time setting. Logic Formation Window.

A time period for execution of the job is attached to the schedule field to form a logic.

(4) Actual Unit Section Logic Formation Window.

In the case where a plurality of actual units are set in the storage part and the like, an assignment logic is formed as to which actual unit should be used according to desired priority.

The logic formation process will now be explained in more detail with reference to FIG. 3, which shows the job section logic formation window.

First, the meaning of the various terms used herein will be defined. The term "strategy" means the policy to prepare a schedule as to which job is executed according to desired priority or which unit is used according to desired priority. The "strategy" forms a part of the mechanism of the automatic scheduling. The term "unit" means equipment for producing, storing, and sending products. The term "plant" means an assembly of the units. The "plant" may be an image of a factory. The term "parts recipe" means a recipe for making, storing and sending the products. Data, such as the necessary raw material and necessary time for manufacturing process, are inputted as "parts recipes" corresponding to the individual parts. The term "recipe" means a recipe used relative to the line and is an assembly of the parts recipes for every line. The "recipe" may be an image of a manufacturing recipe relative to a certain product. The term "line" means a combination of parts. The"line" is consecutively formed of the parts and may be an image of a manufacturing apparatus relative to a certain product.

In FIG. 3, the view shows a job selection logic display field 31. When the cursor is pointed to the display field, the registered logic is displayed on the pull-down menu. When the selection is effected, the selection is displayed on the job selection logic display field. In FIG. 3, the "Optimized 2" is exemplified.

Also shown is comment display field 32. When the comment compiling area of the pull-down menu provided on the image field is selected, the comment setting window is opened. It is possible to write a comment on a content or the like of the logic.

A function block location area 32 is provided. When the function block on the pallet is pointed by the cursor and the position is pointed and clicked on the function block location area, the function block is attached thereto.

The FIG. 3 view shows a pallet 34, on which a variety of specific figures showing the functions are displayed.

A producing area 35 is provided. When the producing area is clicked with a cursor after the function block in the pallet 34 has been selected and located, the function block is set in the function block location area 33. The set function block may be moved.

An attribute changing area 36 is provided. When the content of the block, i.e., the process condition is changed, the attribute changing area is clicked by the cursor after the function block in the function block location area has been selected. In the case where the selected function block is a basic block, the job selection basic block adjustment window is opened so that the setting and changing operations are possible.

A deletion area 37 is provided in FIG. 3. When the function block to be deleted is selected and the deletion area is clicked, the block is deleted. The determination and cancellation of the scheduled step may be performed by clicking the setting area and the canceling area.

By repeating the foregoing steps, it a desired logic is readily formed.

FIG. 4 shows a function of the function block. The "function block" is used to process the selection of an element. The process condition is registered on the block adjustment field. In FIG. 4, input elements are labeled A,B,C,D and E, and the process condition shows that the output elements are B and C in the case where the attribute, a=y, is selected.

When the basic block area is clicked by the cursor on the job selection logic formation window opened on the display field, the various blocks are displayed in a pull-down manner. The respective blocks have associated adjustment image fields and their attributes are registered.

FIG. 5 shows the rule of transfer of input elements to the function blocks. The blocks are operated on the basis of the following rules.

RULE 1. The order of input of the jobs into the first function block according to the job selection logic is the same order as registered in advance from the window as the schedule job.

RULE 2. In the case where the function blocks are arranged vertically, the function blocks are inputted in order from the upper one of the blocks. In the case where the function blocks are arranged horizontally, the function blocks are inputted in order from the left one of the blocks.

RULE 3. In the case where no element to be outputted from the function block is present, all the elements inputted in the function block are again inputted into the next function block located on the right side of the former one.

RULE 4. In the case where there are a plurality of elements to be outputted from the function block, the output elements are inputted into the function block most leftwardly located below the former one.

RULE 5. In the case where the single element is outputted from the function block, the output becomes an output of the overall logic to finish the process.

RULE 6. When a plurality of elements are finally outputted, the element located on the top of the row of the output elements is outputted to finish the process.

The various function blocks prepared on pallet 34 (of FIG. 3) will be explained later.

Figure 6:
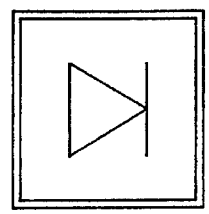
FIG. 6 is a view depicting a default block.

FIG. 6 shows a default block, which outputs the inputted job without any change. The default block obviates the case where any job is selected within the block. The default block is automatically set at the right end of each row of the function block set in the function block location area. The adjustment field is not used.

Figure 7:
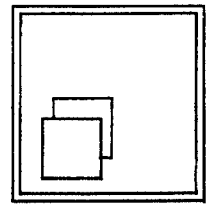
FIGS. 7 (a) and 7 (b) are views depicting an element retrieval block and an adjustment image field.
Figure 7:
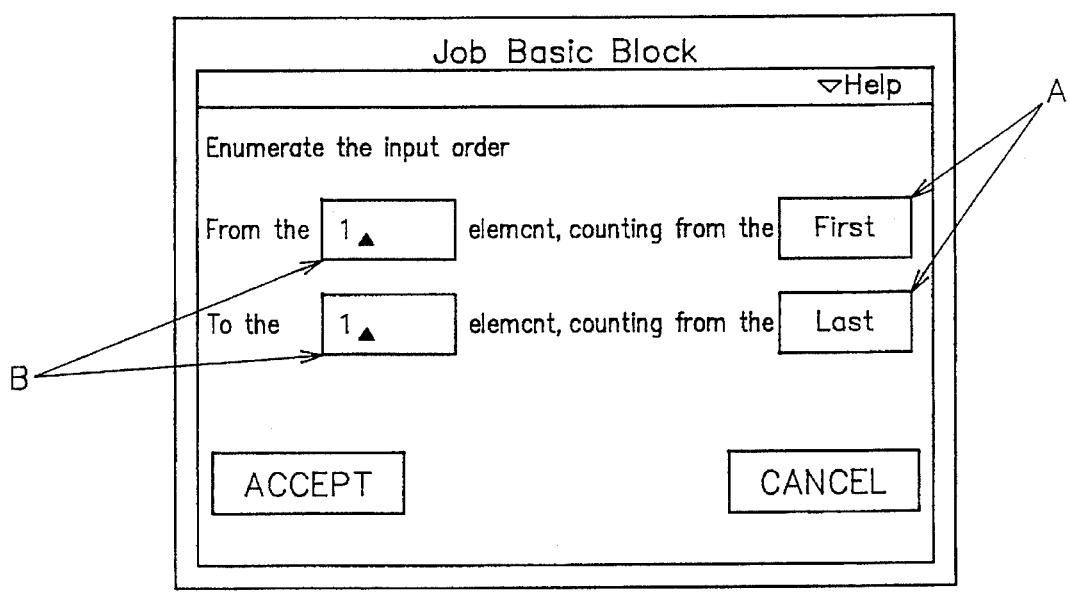

FIG. 7 (a) shows an element row retrieval block, which is a block for setting the condition that any desired number of jobs be selected from the first or last in accordance with the order of the input jobs. When this block is selected by clicking of a cursor in the pallet 34, the adjustment field shown in FIG. 7 (b) is displayed. The adjustment field displays "Enumerate the input order from the 'A'-th element counting from the First/Last to the 'B'-th element counting from the Last/First. The numerals showing the the order are entered into A and B. The selectable letters and blank filling letters are both selected from the letter groups defined in advance.

Figure 8:
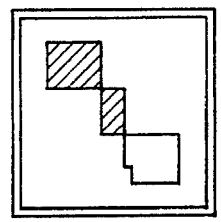
FIGS. 8 (a) and 8 (b) are views depicting an attribute selection block and an adjustment image field.
Figure 8:
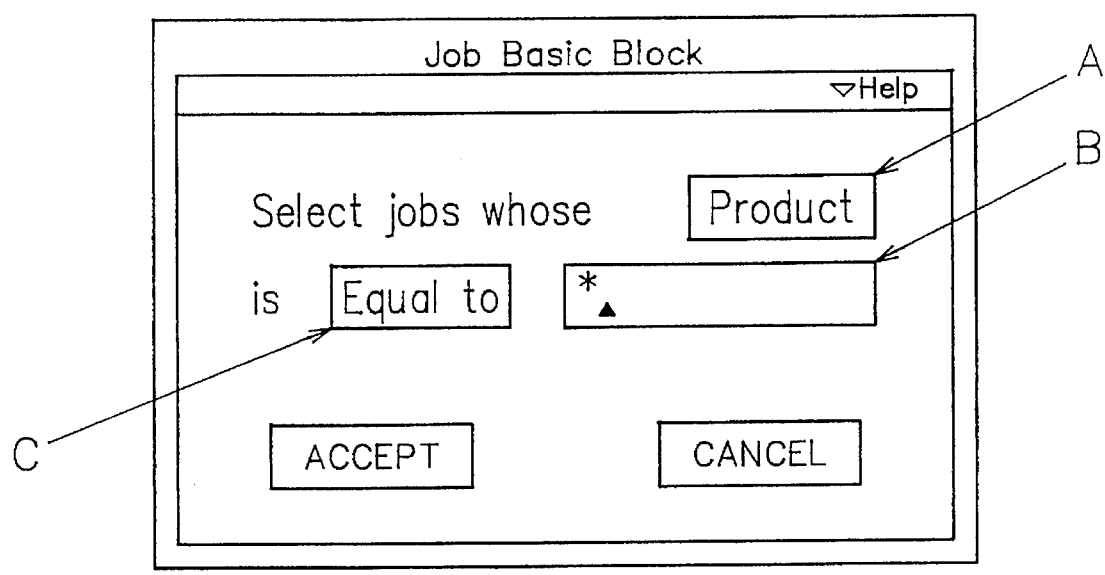

FIG. 8 (a) shows an attribute selection block, which sets the condition that the job be selected on the basis of the specific product name, applied code, working mode and/or job name. When the block is selected in pallet 34, the adjustment field shown in FIG. 8 (b) is displayed. The adjustment filed shows "A selects jobs of B and C". The product/applied code/working mode/name/use attribute are entered into A, name/applied code/working mode/job name are entered into B in conformity with A, and "Equal to" or "Except for" is entered into C. The selectable letters and blank filling letters are both selected from a letter group defined in advance.

Figure 9:
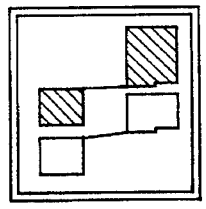
FIGS. 9 (a) and 9 (b) are views depicting a previously selected attribute restricting block and an adjustment image field.
Figure 9:
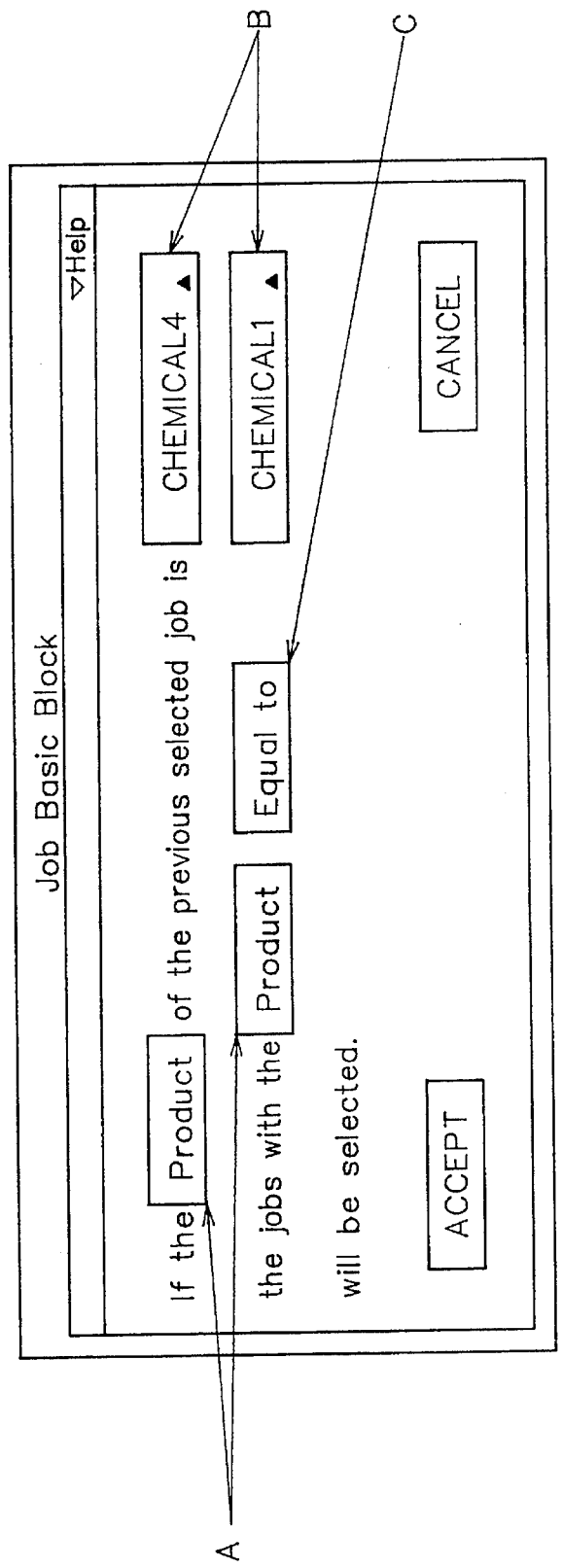

FIG. 9 (a) shows a previously selected attribute restricting block, which sets the condition that a specific job be selected in accordance with the content previously selected. When this block is selected, the adjustment field shown in FIG. 9 (b) is displayed. The adjustment field shows "If the A of the previously selected job is B, then A select the elements of B and C". One of the product, applied code, working mode, name, product name and attribute, is entered into A. One of the product, applied code, working mode, and job name, is entered into B in conformity with A. "Equal to" or "except for" is entered into C. The selectable letters and blank filling letters are both selected from a letter group defined in advance.

Figure 10:
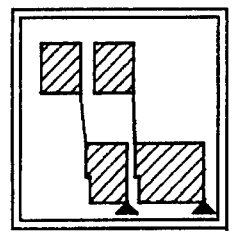
FIGS. 10 (a) and 10 (b) are views depicting a delivery order sorting block and an adjusting image field.
Figure 10:
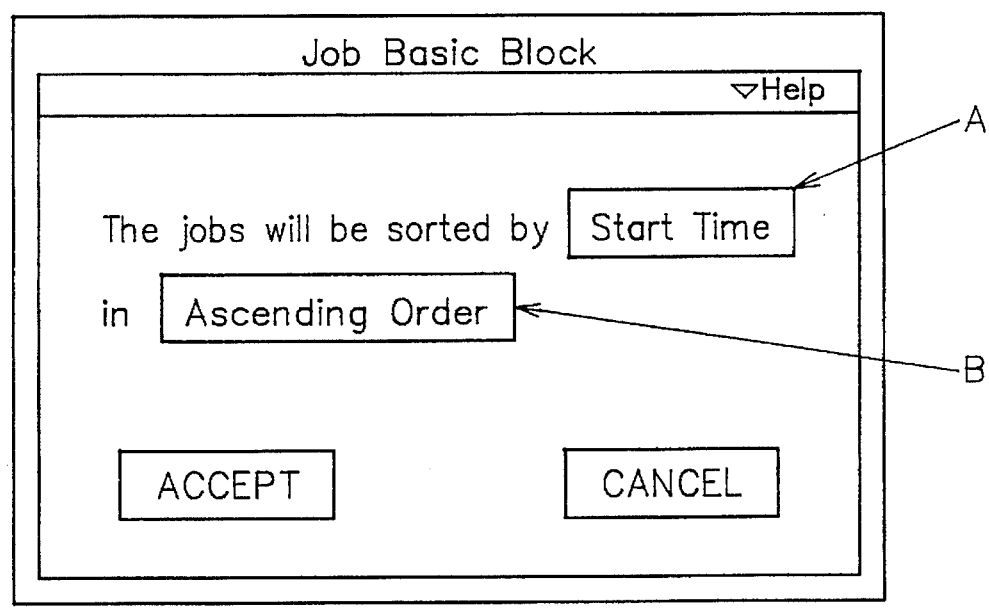

FIG. 10 (a) shows a delivery time sorting block, which sets the condition that the order of the jobs to be inputted into the block be arranged in accordance with the delivery time or the start time. When the block is selected in pallet 34, the adjustment field shown in FIG. 10 (b) is displayed. The adjustment field shows "The job will be sorted by A in B". Any one of the earliest delivery, latest delivery and start time is entered into A. "Ascending Order" or "Descending order" is entered into B. The selectable letters and blank filling letters are both selected from a letter group defined in advance.

Figure 11:
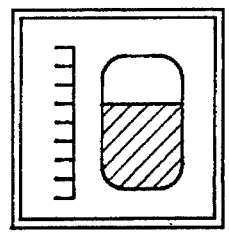
FIGS. 11 (a) and 11 (b) are views depicting a production quantity selection block and an adjustment image field.

FIG. 11 (a) shows a product quantity selection block, which sets the condition that the job be selected on the basis of the production level. When the block is selected in pallet 34, the adjustment field shown in FIG. 11 (b) is displayed. The adjustment field shows "The job whose production level is A, the jobs of B and C will be selected". "Highest" or "Lowest" is entered into A. The numeral showing the production level of the job is entered into B. "More than" or "Less than" is entered into C. The selectable letters and blank filling letters are both selected from a letter group defined in advance.

Figure 12:
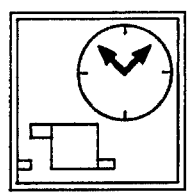
FIGS. 12 (a) and 12 (b) are views depicting an assigned time selection block and an adjustment image field.
Figure 12:
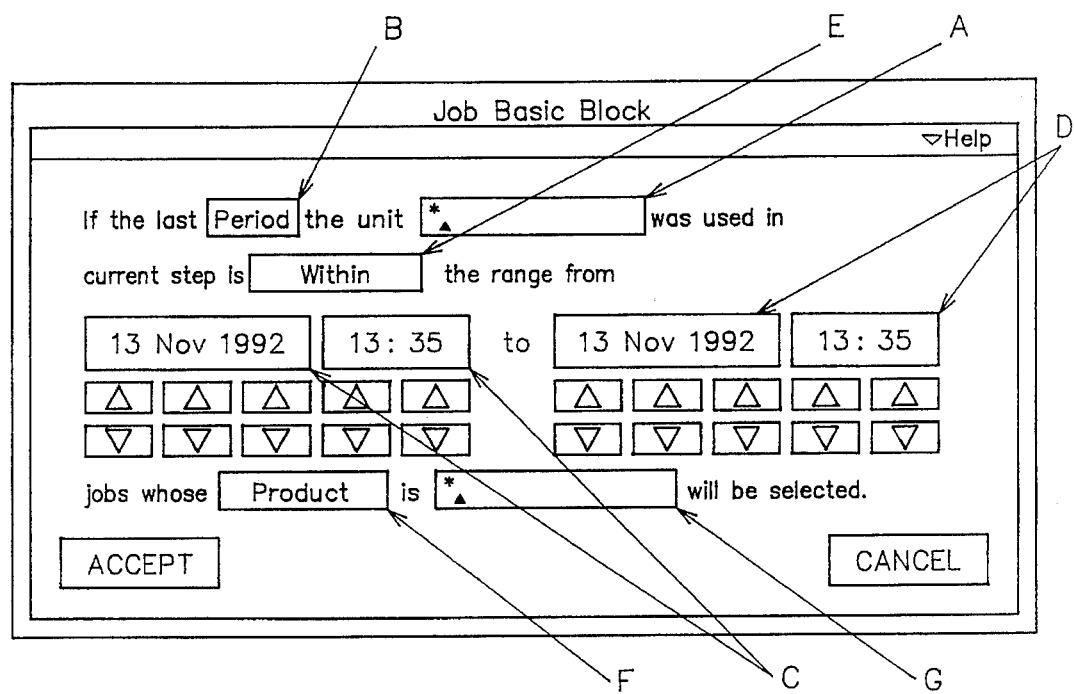

FIG. 12 (a) shows an assigned time block, which sets the condition that the specific job be selected in accordance with a use time of the unit. When the block is selected in pallet 34, the adjustment field shown in FIG. 12 (b) is displayed. The adjustment field shows "If the last B the unit A was used in current step is Within/Out of the range from C and D to E and F, G will select the job of It" The name of the unit is entered into A. Any one of the non-periodic/day unit/week unit/month unit, is entered into B. The date of use of the input unit is entered into C and E. The time of use of the input unit is entered into D and F. Any one of the product name/applied code/working mode/name, is entered into G. Any one of the actually set name/applied code/working mode/job name, is entered into H in conformity with G. The selectable letters and blank filling ethers are both selected from a letter group defined in advance.

Figure 13:
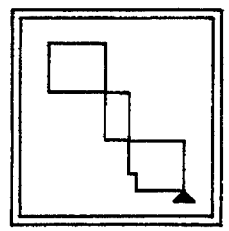
FIGS. 13 (a) and 13 (b) are views depicting a delivery order element selection block and an adjustment image field.
Figure 13:
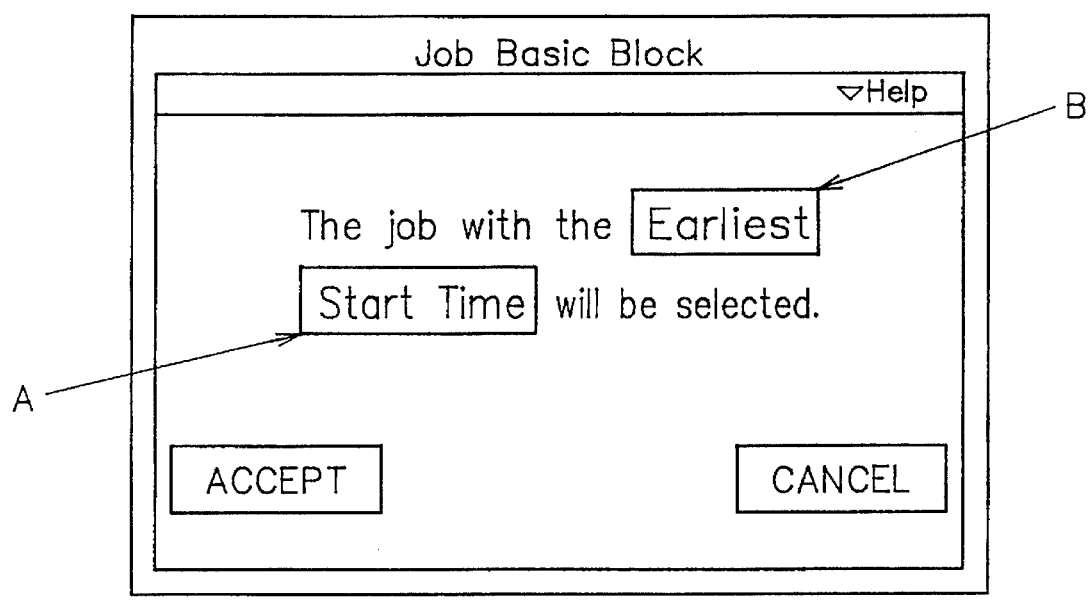

FIG. 13 (a) shows a delivery time block, which sets the condition that the job be selected in accordance with a delivery or a start time. When the block is selected in pallet 34, the adjustment field shown in FIG. 13 (b) is displayed. The adjustment field shows "The job with B being A will be selected". One of the "Earliest Delivery", "Latest Delivery" and "Start Time" is entered into A. "Earliest" or "Latest" is entered into B. The selectable letters and blank filling letters are both selected from a letter group defined in advance.

Figure 14:
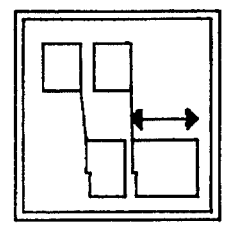
FIGS. 14 (a) and 14 (b) are views depicting a delivery time difference selection block and an adjustment image field.
Figure 14:
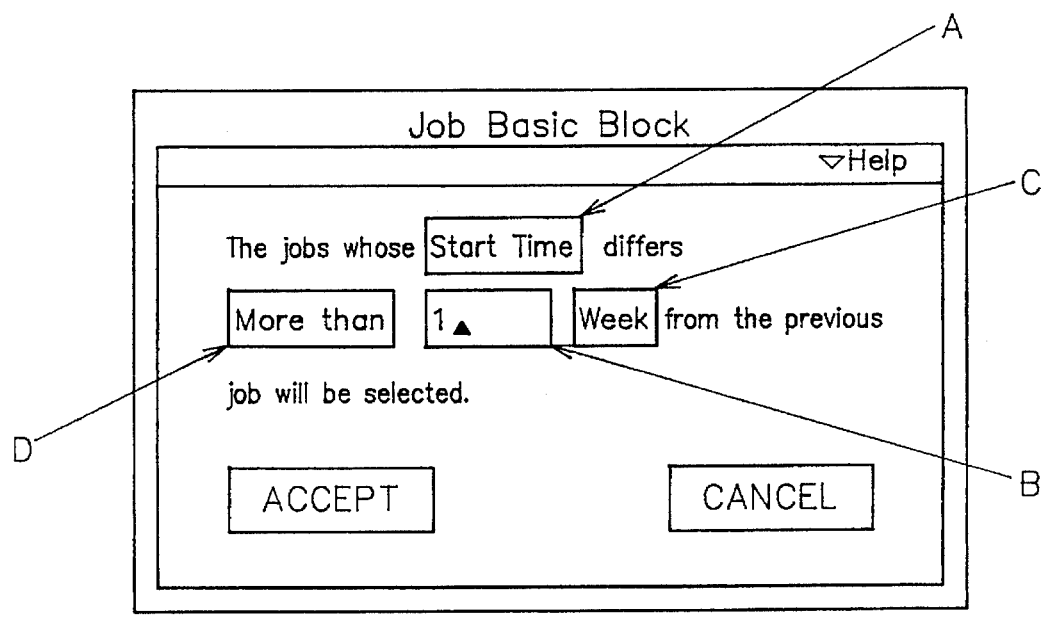

FIG. 14 (a) shows a delivery time difference block, which sets the condition that the job be selected in accordance with a time difference between the current job and the previously selected job. When the block is selected in pallet 34, the adjustment field shown in FIG. 14 (b) is displayed. The adjustment field shows "The jobs whose A differs D between B and C". Any one of "Earliest Delivery", "Latest Delivery" and "Start Time" is entered into A. The numeral representative of the difference in period from A is entered into B.

One of Day, Week and Month is entered into C as a unit of period of time. "More than" or "Less than" is entered into D. The selectable letters and blank filling letters are both selected from a letter group defined in advance.

Figure 15:
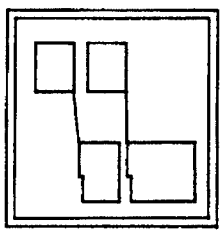
FIGS. 15 (a) and 15 (b) are views depicting the same attribute selection block and an adjustment image field.
Figure 15:
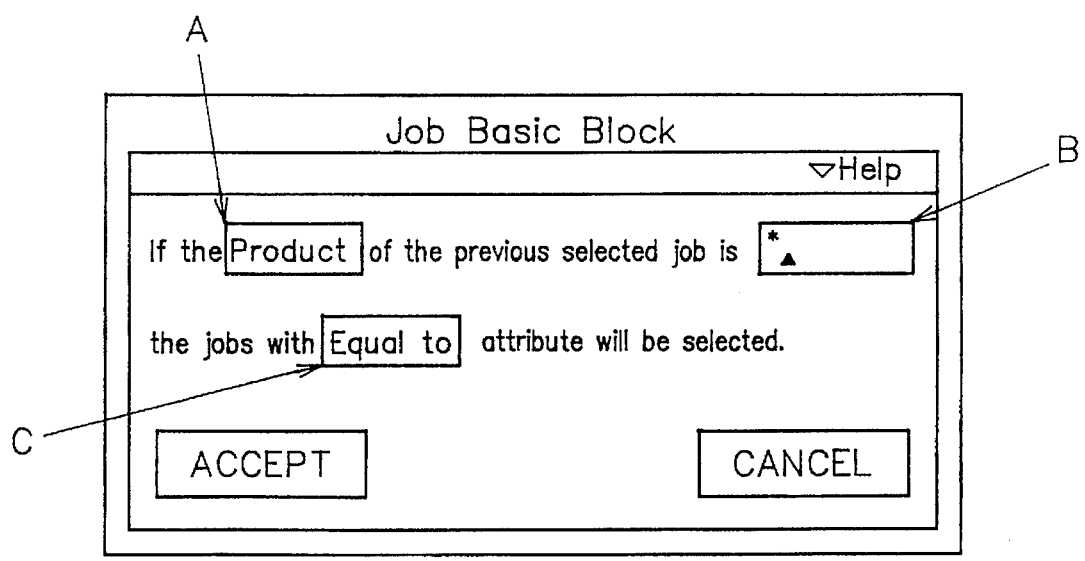

FIG. 15 (a) shows a same attribute block, which sets the condition that the job be selected so as to have the same attribute of the previously selected job. When the block is selected in pallet 34, the adjustment field shown in FIG. 15 (b) is displayed. The adjustment field shows "If the A of the previous selected job is B, the jobs with "Equal to" or "Other" attribute will be selected". One of the product, applied code and working mode, is entered into A. One of the actually set product, applied code, and working mode, is entered into B in conformity with A. "Equal to" or "Other" is entered into C. The selectable letters and blank filling letters are both selected from a letter group defined in advance.

Figure 16:
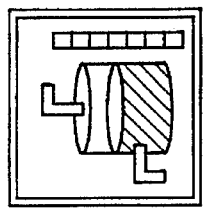
Figure 16:
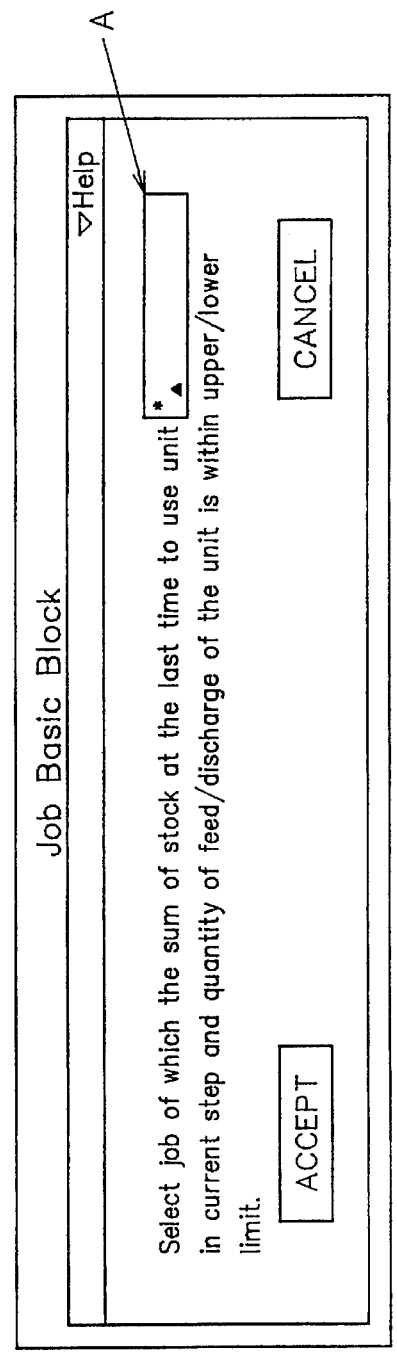

FIG. 16 (a) shows a selection block, within the upper/lower limit of the stock, which sets the condition that the job in which the quantity of the stock in the specific unit would not exceed the upper limit or the lower limit of the unit, be selected. When the block is selected in pallet 34, the adjustment field shown in FIG. 6 (b) shows "Select job of which the sum of stock at the last time to use unit A in current step and quantity of feed/discharge of the unit is within upper/lower limit". The name of the unit is entered into A. In order to set the function block field on the unit selection logic formation window and the operation of the function block, the block adjustment field for clicking, opening and inputting the basic blocks is displayed together on the unit selection logic formation image field. The selectable letters and blank filling letters are both selected from a letter group defined in advance.

FIG. 17 (a) shows a use status block, which set the condition that the unit be selected on the basis of the use time or a frequency of usage. When the block is selected in pallet 34, the adjustment field shown in FIG. 17 (b) shows "The unit whose A of usage is the B will be selected". The time or frequency is entered into A. "highest" or "Lowest" is entered into B. The selectable letters and blank filling letters are both selected from a letter group defined in advance.

FIG.18 (a) shows a part element number restricting block, which sets the condition that an upper limit of the usable unit number be set in accordance with the composite condition of recipe and part. When the block is selected in pallet 34, the adjustment field shown in FIG. 18 (b) shows " If the recipe is A and the part is B the maximum number of units that can be used is C. This is valid for D". The name of the recipe is entered into A. The name of the part is entered into B. The numeral showing the maximum number of units that can be used is entered into C. "The first job that fits the condition above" is entered into D. The selectable letters and blank filling letters are both selected from a letter group defined in advance.

FIG. 19 (a) shows a same element consecutive selection block, which sets the condition that the same unit be consecutively selected in a plurality of jobs. When the block is selected in pallet 34, the adjustment field shown in FIG. 19 (b), shows "In the current job, if the part is A the same unit will be selected". The name of the part is entered into A. The selectable letters and blank filling letters are both selected from a letter group defined in advance.

FIG. 20 (a) shows a selection block within an upper/lower limit of the stock, which sets the condition-that the unit be selected in accordance with a difference between a stock quantity and an upper or lower limit of the unit. When the block is selected in pallet 34, the adjustment field shown in FIG. 20 (b), shows "Select unit of which the sum of stock at the last time of use in current step and quantity of Feed/Discharge of A limit is B". One of "Upper" and "Lower" is inputted into A. One of "Maximum" and "Minimum" is entered into B. The selectable letters and blank filling letters are both selected from a letter group defined in advance.

FIG. 21 (a) shows a job attribute selection block, which sets the condition that all the units be selected under specific conditions. When the block is selected in pallet 34, the adjustment field shown in FIG. 21 (b), shows "If the job's A is B and C, all the units will be selected". One of product, applied code, working mode, and name, is entered into A. One of the actually set product name, applied code, working mode, and job name, is entered into B in conformity with A. The selectable letters and blank filling letters are both selected from a letter group defined in advance.

FIG. 22 (a) shows a part selection block, which sets the condition that all the units be selected in accordance with a composite condition of the recipe and the part. When this block is selected in pallet 34, the adjustment field shown in FIG. 22 (b) shows "If the recipe is A and the part is C and B, all the units will be selected". The name of the recipe is entered into A. The name of the part is entered into B. "equal to" or "not equal to" is entered into C. The selectable letters and blank filling letters are both selected from a letter group defined in advance.

FIG. 23 (a) shows a production quantity selection block, which sets the condition that the unit be selected in accordance with the production level of the job or part. When the block is selected in pallet 34, the adjustment field shown in FIG. 23.(b), shows "If the production level of the A is C and B, all units will be selected". One of the job and the part is entered into A. The numeral showing the production level of A is entered into B. "more than " or "less than" is entered into C. The selectable letters and blank filling letters are both selected from a letter group defined in advace.

FIG. 24 (a) shows an assigned time selection block, which sets the condition that the unit be selected on the basis of the usable time. When the block is selected in pallet 34 , the adjustment field shown in FIG. 24 (b), shows "Select Unit of which time to stick on schedule bar is the A in current step". "Earliest" or "Latest" is entered into A. The selectable letters and blank filling letters are both selected from a letter group defined in advance.

FIG. 25 (a) shows a use status block in feeding, which sets the condition that the actual unit whose use time or frequency is the shortest be selected. When this block is selected in pallet 34, the adjustment field shown in FIG. 25 (b) , shows "The unit whose A of usage is the lowest will be selected". The time or frequency is entered into A. The selectable letters and blank filling letters are both selected from a letter group defined in advance.

FIG. 26 (a) shows a stock quantity selection block in feeding, which sets the condition that the actual unit be selected on the basis of the available feed quantity. When the block is selected in pallet 34, the adjustment field shown in FIG. 26 (b), shows "The element whose available feed quantity is A will be selected". One of "The Highest" "The Lowest" and "more than feed amount" is entered into A. The "more than feed amount" means that the upper limit of the stock quantity is not exceeded. The selectable letters and blank filling letters are both selected from a letter group defined in advance.

FIG. 27 (a) shows a use status block in feeding, which sets the condition that the actual unit whose use time and frequency is lowest be selected. When the block is selected in pallet 34, the adjustment field shown in FIG. 27 (b), shows "The unit whose A of usage is lowest will be selected". Time or frequency is entered into A. The selectable letters and blank filling letters are both selected from a letter group defined in advance.

FIG. 28 (a) shows a stock quantity selection block in discharge, which sets the condition that the actual unit be selected on the basis of the available discharge quantity. When the block is selected in pallet 34, the adjustment field shown in FIG. 28 (b), shows "The actual unit whose available discharge quantity is A will be selected". One of the "The Highest", "The Lowest" and "more than discharge amount " is entered into A. The term "more than discharge amount" means that the lower limit of the stock quantity is not exceeded. The selectable letters and blank filling letters are both selected from a letter group defined in advance.

FIG. 29 (a) shows a feed finish time selection block, which sets the condition that the actual unit be selected on the basis of the feed finish time. When the block is selected in pallet 34, the adjustment field shown in FIG. 29 (b), shows "Select an element that the last time its stock was fed is A". "Latest" or "Oldest" is entered into A. The selectable letters and blank filling letters are both selected from a letter group defined in advance.

FIG. 30 shows an empty stock selection block, which sets the condition that the actual unit be selected on the basis of the stock quantity. The adjustment field shows "Select the element that has no stock". The adjustment field is not used.

An example of the operation to obtain formation of the job selection logic will now be described in detail. In the following description, the function block field displayed on pallet 34 on the job selection logic formation window (see FIG. 3) and the block adjustment field for setting the operation of the function block will be explained together. On the block adjustment field, a predetermined function block area and a basic block area are clicked, retrieved and inputted on the job selection logic formation window field (see FIG. 3). The selectable letters and blank filling letters are both selected from a letter group defined in advance.

FIG. 31 shows an embodiment wherein the job selection log is is formed. The jobs J1 to J7, which are object jobs 51 for scheduling, are inputted separately on a display field in a predetermined order.

The operational order in the foregoing embodiment will be explained with reference to the flow chart shown in FIGS. 32 (a), 32 (b) and 32 (c) taken together. A logic for selecting the jobs from the plurality of input jobs according to desired priority under the following conditions and steps, is formed.

Condition 1

Priority is given to the jobs whose working modes are production.

Condition 2

The job whose start time is earliest, is selected.

Steps 1 and 2

The job selection logic formation window (see FIG. 3) is first opened in the pull-down manner on the display field as mentioned in connection with FIG. 1. The name of the logic is determined by clicking the job selection logic display field 31.

Steps 3 and 4

The attribute selection block (see FIG.8) is first assigned on pallet 34 in FIG. 3 to open the adjustment field and the working type, the production and "equal to" into A, B and C, respectively.

Step 5

A predetermined position is again pointed on the function block location area 33 by use of the cursor and the function block "work type in production" (1) is located.

Steps 6 and 7

The delivery order element selection block (see FIG. 13) is assigned on pallet 34 in the same manner, and the adjustment field is open. The start time and the "earliest" are entered into A and B.

Step 8

A predetermined position is again pointed on the function block location area 33 by use of the cursor and the function block "starting time is earliest" (2) is located.

Steps 9 and 10

The delivery order element selection block (see FIG. 13) is assigned on the pallet 34 in the same manner, and the adjustment field is open. The "earliest delivery" and "early" are entered into A and B.

Step 11

A predetermined position is again pointed on the function block location area 33 by use of the cursor and the function block "earliest, delivery is earliest" (3) is located.

Steps 12 and 13

In the same manner, the attribute selection block (see FIG. 8) is pointed on pallet 34 and the adjustment field is opened The "products" "hot curry powder" and "equal to" are entered into A, B and C, respectively.

Step 14

A predetermined position is again pointed on the function block location area 33 by use of the cursor and the function block "products are hot curry powder" (4) is located.

Thus, the job selection logic 52 of the job selection logic (see FIG. 31) is completed on the job selection logic formation window (see FIG. 3).

Step 15

The logic is operated in accordance with Rules 1–6, discussed above with reference to FIG. 5. The results represent the operational results of each function block as results 53 of input/output elements for each function block of FIG. 31.

As final results, jobs J4 and J7 are selected according to desired priority by locating predetermined four function blocks of jobs J1–J7. According to Rule 6, in the case where the plurality of elements are outputted finally, the element of the leading end, of the arrangement of the output elements is outputted to complete the process. Accordingly, the job J4 has the greatest priority to be scheduled and outputted on the display field.

FIG. 33 shows the case where the logic formation window is represented in the form of multiple layers, wherein function block 2 has the second and third stages to perform the element selection. When input element row "abcdefghij" is inputted into function block 1, then the selected result is outputted as "abcdef". If the result becomes the input to function block 2, the selected "abcd" is outputted. As a result of the selection through function block 4, the output element row "dc" is finally outputted through default block 6.

On the other hand, in the case where any selection is effected in function block 2, the output "abcdef" of function block 1 is inputted to function block 21 of the second stage layer where, as a result of the selection, "abc" is inputted into function blocks 221 and 222 of the third stage layer. In this case, there is no output directed downwardly so that the operation is returned back to the second stage layer to enter function block 23. Also, in function block 23, since there is no output directed downwardly, all of the operation is returned back to the first stage layer, to enter function block 3 where there is no output directed downwardly, to thereby complete the logic.

In the case where the output "abcdef" of the function block is subjected to no selection and is inputted into function block 3, if the second stage layer is selected, the output is inputted into function block 31. At this time, the final selection result of the stage layer is "abcd". The operation is returned back to the first stage layer so that "abscd" is inputted into function block 4. As a result of the selection in function block 4, the output element row "dc" is finally outputted through default block 6.

Each function block in the respective stage layers has an adjustment field to perform a predetermined setting and to execute the selection operation of logics in accordance with the rules mentioned in connection with FIGS. 4 and 5, exactly in the same way as in the first stage layer.

The foregoing description is illustrative of the principles of the invention. Numerous extensions and modifications thereof would be apparent to the worker skilled in the art. All such extensions and modifications are to be construed to be within the spirit and scope of the invention.

What is claimed is:

1. A scheduling system for displaying, on a display field, a plurality of function blocks, each of which assigns a predetermined program operation, and for relocating the plurality of function blocks to realize a plurality of logics for scheduling, said scheduling system comprising a logic formation interface for combining and relocating ones of said function blocks for assigning predetermined program operations, thereby assigning operational contents and operational order of a program and completing formed logics for scheduling;

a logic storage unit for storing the formed logics;

an execution unit for executing the scheduling by using the formed logics stored in said logic storage unit; and wherein each of said plurality of function blocks comprises means for performing evaluation on basis of element selection in a function block;

means for transferring a row of output elements from a first function block to an adjacent function block located in a first location when a row of input elements in said first function block is identical to the performed evaluation; and means for transferring said row of input elements from said first function block to another adjacent function block located in a second location when said row of input elements in said first function block is not identical to the performed evaluation.

2. The system of claim 1, wherein a logic display field formed of the function block which assigns a plurality of predetermined program operations is used as a first stage layer, and any function block located in the first stage layer is again pointed by a pointing device so that, using an input element to the function block which has been again pointed as an input element, and a display field for a second stage layer which can form a location of the function blocks in a same manner as in the first stage layer, is provided and a final output of the last-mentioned display field is used as an output of the function block previously assigned in the first stage layer.

3. The system of claim 1, wherein an element row retrieval block is prepared as a function block which selects any desired number of jobs counting from a first job or from a last job in accordance with an order of input jobs, and wherein an adjustment field is structured so that the field shows "elements from 'A'-th job counting from the first/last job to 'B'-th job counting from the last/first job" in the order of input jobs, wherein numerals representative of the order of jobs are entered into A and B.

4. The system of claim 1, wherein an attribute selection block is prepared as a function block which selects a job on basis of a specific product name, an applied code, a working mode, or a job name, and wherein an adjustment field is structured so that the field shows "A selects B and C", wherein one of a product, an applied code, a working mode, a name, and an usage attribute is entered into A, one of the actually set name, applied code, working mode, and job name, is entered into B in conformity with A, and "equal to" or "except for" is entered into C.

5. The system of claim 1, wherein a previously selected attribute restriction block is prepared as a function block, which selects a specific job in accordance with a content of the previously selected job, and wherein an adjustment field is structured so that the field shows "if A of the previously selected job is B, A selects B and C", where one of a product, an applied code, a working mode, a name, a product name, and an attribute, is entered into A, one of the actually set product name, applied code, working mode, and job name, is entered into B in conformity with A, and "equal to" and "except for" is entered into C.

6. The system of claim 1, wherein a delivery order sorting block is prepared as a function block, which relocates order of jobs entered into the block in accordance with delivery time or start time, and wherein an adjustment field is structured so that the field shows "the elements A and B are relocated" where one of the earliest delivery, latest delivery and start time is entered into A and one of ascending order and descending order is entered into B.

7. The system of claim 1, wherein a production quantity selection block is prepared as a function block which selects a job in accordance with a production quantity, and wherein an adjustment field is structured so that the field shows "an element whose production quantity is A is selected and an element whose production quantity is B and C is selected", where highest or lowest is entered into A, a numeral which is representative of the production quantity is entered into B, and "more than" or "less than" is entered into C.

8. The system of claim 1, wherein an assigned time selection block is prepared as a function block which selects a specific job in accordance with a use of a unit, and wherein an adjustment field is structured so that the field shows "if the final use time B of a current step of a unit A is in the range of E from C to D, F selects a job G" where name of the unit is entered into A, one of a non-period, a day unit, a week unit, and a month unit, is selectively entered into B, amount of use of unit entered in A is entered into C and D, "within" or "out of" is entered into E, one of a product, an applied code, a working mode, and a name, is selectively entered into F, and any one of actually set product name, applied code, working mode, and job name, is entered into G in conformity with F.

9. The system of claim 1, wherein a delivery order element selection block is prepared as a function block which selects a job in accordance with delivery time and start time, and wherein an adjustment field is structured so that the field shows "an element whose A is B is selected", where any one of earliest delivery, latest delivery, and start time, is entered into A and the earliest delivery or the latest delivery is entered into B.

10. The system of claim 1, wherein a delivery difference selection block is prepared as a function block which selects a job in accordance with a difference in term relative to a previously selected job, and wherein an adjustment field is structured so that the field shows "an element whose difference in A relative to the previously selected job is B, C and D is selected", where one of earliest delivery, latest delivery, and start time is entered into A, a numeral representative of the difference in terms relative to A is entered into B, any one of day, week, and month, is entered into C, and "less than" or "more than" is entered into D.

11. The system of claim 1, wherein a same attribute selection block is prepared as a function block which selects a job which has the same attribute as that of the previously selected job, and wherein an adjustment field is structured so that the field shows "if A of the previously selected job is B, an element C the same attribute as that of the previously selected job is selected", where on of a product, an applied code, and a working mode, is selectively entered into A, one of the actually set product name, applied code, and working mode, is entered into B in conformity with A, and "equal to" or "not equal to" is entered into C.

12. The system of claim 1, wherein a stock level upper/lower limit selection block is prepared as a function block a job whose stock level in a specific unit does not exceed an upper limit or a lower limit of the unit, and wherein an adjustment field is structured so that the field shows "an element in which a sum of the stock quantity at the final use time of a current step of the unit A and the feed/discharge quantity will not exceed the upper/lower limit is selected", where a name of the unit is entered into A.

13. The system of claim 1, wherein a use status selection block is prepared as a function block which selects a unit in accordance with a use time or a use frequency of the unit, and wherein an adjustment field is structured so that the field shows "an element whose use A is B is selected" where time or frequency is entered into A, and the highest or lowest is entered into B.

14. The system of claim 1, wherein a part element number restricting block is prepared as a function block which selects an upper limit of an usable unit number in accordance with a composite condition of recipes and parts, and wherein an adjustment field is structured so that the field shows "if a recipe is A and a part is B, the upper limit of tile usable unit number is C, but this is valid for D", where a name of the recipe is entered into A, a name of the part is entered into B, a numeral representative of the upper limit of the usable number is entered into C, and "within one job" or "within all jobs" is entered into D.

15. The system of claim 1, wherein a same element consecutive selection block is prepared as a function block which consecutively sets a same unit in a plurality of parts within the job, and wherein an adjustment field is structured so that the field shows "a name of a part to be selected in the same unit in a current job is A", where a name of the part is entered into A.

16. The system of claim 1, wherein a stock level upper/lower limit selection block is prepared as a function block which selects a unit in accordance with a difference in stock quantity between an upper limit and a lower limit of the unit, and wherein an adjustment field is structured so that the field shows "a unit in which a sum of the stock quantity at the final use time in a current step and a feed/discharge amount of the unit will not exceed upper/lower limits and a difference relative to A limit is B is selected", where "upper" and "lower" is entered into A and highest or lowest is entered into B.

17. The system of claim 1, wherein a job attribute selection block is prepared as a function block which selects all units under specific conditions of a job, and wherein an adjustment field is structured so that the field shows "if A of the job is C B, all the elements are selected", where any one of a product, an applied code, a working mode, and a name, is entered into A, any one of an actually set product name, applied code, working mode, and job name, is entered into B in conformity with A, and "equal to" or "not equal to" is entered into C.

18. The system of claim 1, wherein a part selection block is prepared as a function block which selects all units under a composite condition of a recipe and a part, and wherein an adjustment field is structured so that the field shows "if/unless a recipe is A and a part is B, all the elements are selected", where a name of the recipe is entered into A, and a name of the part is entered into B.

19. The system of claim 1, wherein a production quantity selection block is prepared as a function block which selects a unit in accordance with the production quantity of a job or a part, and wherein an adjustment field is structured so that the field shows "if the production quantity of A is C B, all the elements are selected", where the job or the part is entered into A, a numeral representative of the production quantity is entered into B, and "more than" or "less than" is entered into C.

20. The system of claim 1, wherein an assigned time selection block is prepared as a function block which selects a unit in accordance with time, and wherein an adjustment field is structure so that the field shows "an element whose time to stick a schedule bar at a current step is A is selected", where earliest or latest is entered into A.

21. The system of claim 1, wherein a use status selection block in feeding is prepared as a function block which selects a unit whose use or frequency in an actual unit is lowest, and wherein an adjustment field is structured so that the field shows "an element whose A of usage in feeding is the lowest is selected", where time or frequency is entered into A.

22. The system of claim 1, wherein a stock status selection block in feeding is prepared as a function block which selects an unit in accordance with feeding amount, and wherein an adjustment field is structured so that the field shows "if the feeding possible amount is positive and A, an element is selected" where one of highest, lowest, and "more than feeding amount" is entered into A.

23. The system of claim 1, wherein a use status selection block in discharging is prepared as a function block which selects a unit whose use or frequency of use in an unit is lowest, and wherein an adjustment field is structured so that the field shows "an element whose A of usage in discharging is the lowest is selected" where time or frequency is entered into A.

24. The system of claim 1, wherein a stock status selection block in discharging is prepared as a function block which selects an unit in accordance with a discharging amount, and wherein an adjustment field is structured so that the field shows "if the discharging possible amount is positive and A, an element is selected", where one of highest, lowest and "more than discharging amount" is entered into A.

25. The system of claim 1, wherein a feed time selection is prepared as a function block which selects an unit in accordance with a time a stock quantity has been fed, and wherein an adjustment field is structured so that the field shows "an element in which a time the stock quantity bas been fed is A is selected", where "earliest" or "latest" is entered into A.

26. The system of claim 1, wherein an empty stock selection block is prepared as a function block which selects an unit in accordance with stock quantity, and wherein an adjustment field is structured so that the field shows "a unit whose stock quantity is empty is selected".

* * * * *